US010752777B2

(12) United States Patent
Heikkila et al.

(10) Patent No.: US 10,752,777 B2
(45) Date of Patent: Aug. 25, 2020

(54) POLYMER COMPOSITE COMPRISING AN INTERFACIALLY MODIFIED FIBER AND PARTICLE

(71) Applicant: TUNDRA COMPOSITES, LLC, White Bear Lake, MN (US)

(72) Inventors: Kurt E. Heikkila, Marine on the St. Croix, MN (US); John S. Kroll, Blaine, MN (US)

(73) Assignee: Tundra Composites, LLC, White Bear Lake, MN (US)

( * ) Notice: Subject to any disclaimer, the term of this patent is extended or adjusted under 35 U.S.C. 154(b) by 0 days.

(21) Appl. No.: 16/251,301

(22) Filed: Jan. 18, 2019

(65) Prior Publication Data

US 2019/0194462 A1    Jun. 27, 2019

Related U.S. Application Data

(62) Division of application No. 14/771,175, filed as application No. PCT/US2014/026932 on Mar. 13, 2014, now Pat. No. 10,227,490.

(51) Int. Cl.
| | |
|---|---|
| *C08L 97/02* | (2006.01) |
| *B27N 1/02* | (2006.01) |
| *B27N 5/00* | (2006.01) |
| *B27N 3/28* | (2006.01) |
| *B33Y 70/00* | (2020.01) |
| *B29C 64/112* | (2017.01) |
| *B29C 64/118* | (2017.01) |
| *C08J 5/04* | (2006.01) |
| *C08J 5/06* | (2006.01) |
| *C08J 5/08* | (2006.01) |
| *C08J 5/10* | (2006.01) |
| *C08K 7/02* | (2006.01) |
| *C08K 7/14* | (2006.01) |
| *B29C 64/165* | (2017.01) |
| *C08K 9/04* | (2006.01) |
| *C08L 27/06* | (2006.01) |
| *B33Y 10/00* | (2015.01) |
| *B29K 27/06* | (2006.01) |
| *B29K 105/12* | (2006.01) |
| *B29K 105/16* | (2006.01) |
| *B29K 311/14* | (2006.01) |
| *B29K 509/08* | (2006.01) |
| *B29L 31/00* | (2006.01) |

(52) U.S. Cl.
CPC ............... *C08L 97/02* (2013.01); *B27N 1/02* (2013.01); *B27N 3/28* (2013.01); *B27N 5/00* (2013.01); *B29C 64/112* (2017.08); *B29C 64/118* (2017.08); *B29C 64/165* (2017.08); *C08J 5/043* (2013.01); *C08J 5/045* (2013.01); *C08J 5/06* (2013.01); *C08J 5/08* (2013.01); *C08J 5/10* (2013.01); *C08K 7/02* (2013.01); *C08K 7/14* (2013.01); *C08K 9/04* (2013.01); *C08L 27/06* (2013.01); *B29K 2027/06* (2013.01); *B29K 2105/12* (2013.01); *B29K 2105/16* (2013.01); *B29K 2311/14* (2013.01); *B29K 2509/08* (2013.01); *B29L 2031/776* (2013.01); *B33Y 10/00* (2014.12); *B33Y 70/00* (2014.12); *C08J 2327/06* (2013.01); *C08J 2367/04* (2013.01); *C08K 2201/016* (2013.01); *C08L 2205/16* (2013.01)

(58) Field of Classification Search
None
See application file for complete search history.

(56) References Cited

U.S. PATENT DOCUMENTS

| 5,153,241 A | 10/1992 | Beshay |
| 2002/0106498 A1 | 8/2002 | Deaner et al. |
| 2009/0054559 A1 | 2/2009 | Serizawa et al. |

FOREIGN PATENT DOCUMENTS

| EP | 2186846 B1 | 1/2012 |
| WO | 2012088375 A2 | 6/2012 |
| WO | 2013122944 A1 | 8/2013 |

*Primary Examiner* — Mary Lynn F Theisen
(74) *Attorney, Agent, or Firm* — Mark J. DiPietro; Fred C. Morgan

(57) ABSTRACT

Embodiments herein relate to a composite material including about 10 to 80 wt. % of a polymer phase, the polymer phase comprising a thermoplastic polymer with a density of less than about 1.9 g-m$^{-3}$; and about 20 to 90 wt. % of a dispersed mixed particulate phase, the dispersed mixed particulate phase comprising a mixed particulate and about 0.005 to 8 wt. % of a coating of at least one interfacial modifier. The mixed particulate including a portion of a reinforcing fiber and a portion of a particle. The composite material having a Young's modulus of greater than 700 MPa. In various embodiments, structural building components made from the composite are included as well as additive manufacturing components made from the composite. Other embodiments are also included herein.

15 Claims, 8 Drawing Sheets

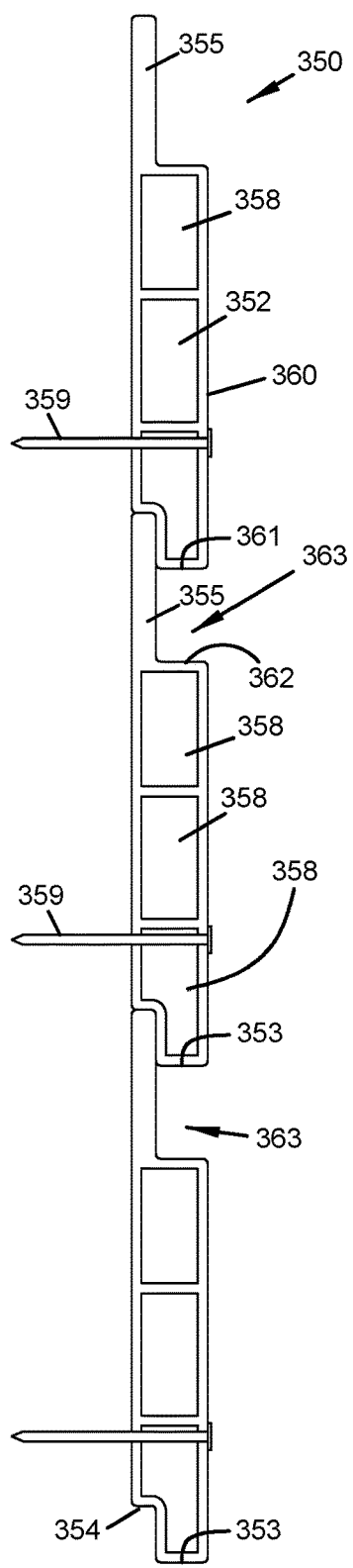
FIG. 3A
FIG. 3B
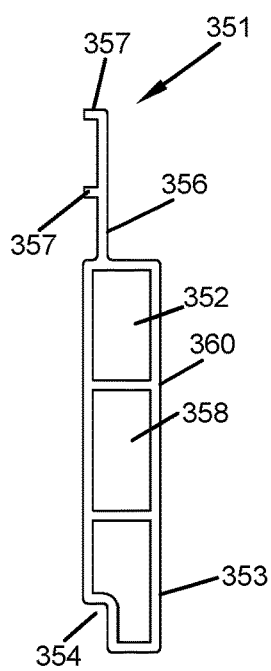
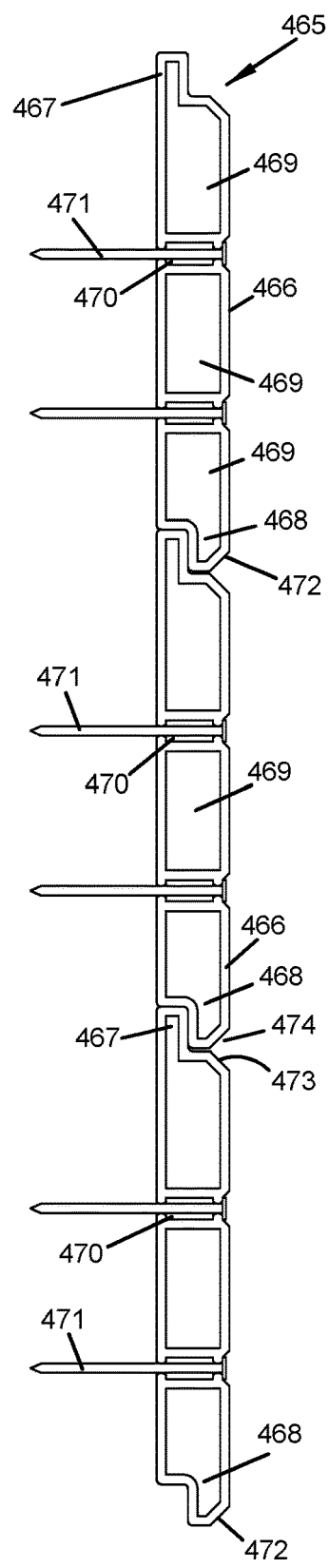
FIG. 4

POLYMER COMPOSITE COMPRISING AN INTERFACIALLY MODIFIED FIBER AND PARTICLE

CROSS-REFERENCE TO RELATED APPLICATIONS

This application is divisional of U.S. patent application Ser. No. 14/771,175 filed Aug. 27, 2015, which is a National Stage Entry of PCT/US2014/026932 filed Mar. 13, 2014, which claims priority to U.S. Provisional Patent Application 61/782,516, filed on Mar. 14, 2013 and titled "A POLYMER COMPOSITE COMPRISING AN INTERFACIALLY MODIFIED FIBER AND PARTICLE". The entire disclosures of all being incorporated herein by reference.

FIELD

Embodiments herein relate to composites including a polymer phase and a dispersed mixed particulate phase comprising a mixed particulate.

BACKGROUND

Substantial attention has been paid to the creation of composite materials with unique properties. Included in this class of materials are materials with improved viscoelastic character, varying densities, varying surface characteristics and other properties which may be used to construct a composition with improved properties. Composite materials have been made in the past by combining generally two dissimilar components to obtain beneficial properties from both components. A true composite is unique because the interaction and engineered combination of the components provides the best properties and characteristics from both components.

Many types of composite materials are known. Generally, the art recognizes that combining metals of certain types and proportions to form an alloy that provides unique properties in the metal/metal alloy materials with different properties than the metals alone. Metal/ceramic composites have been made typically involving combining metal powder or fiber with clay materials that can be sintered into a metal/ceramic composite.

Combining typically a thermoplastic or a thermosetting polymer phase with a reinforcing powder or fiber produces a range of filled materials and, under the correct processing conditions, can form a true polymer composite. In contrast, a filled polymer, with the additive as filler, cannot display composite properties. A filler material typically is comprised of inorganic materials that act as either pigments or replacement for the polymer component. Fillers are often a substitution for a more expensive component in the composition. A vast variety of fiber-reinforced composites have been made typically to obtain fiber reinforcement properties used to modify only the mechanical properties of the polymer in a specific composite.

Polymer materials have been combined with cellulosic fiber to make extruded materials. However, such materials have not successfully been used in the form of a structural member that is a direct replacement for wood or other materials, such as aluminum and concrete, for temporary structures that are useful for military, commercial or building material applications. Such materials can be in the form of a decorative or structural material or member. Common extruded thermoplastic composite materials cannot provide thermal and structural properties similar to wood or other structural materials. These extruded materials fail to have sufficient modulus, compressive strength, and coefficient of thermal expansion that matches wood to produce a direct replacement material. Further, many prior art extruded composites must be milled after extrusion to a final useful shape. One class of composite, a polyvinyl chloride/wood flour material, poses the added problem that wood dust, which can accumulate during manufacture, tends to be explosive at certain concentrations of very fine, airborne, wood dust or powder.

Many of these materials containing polymer and particulate are admixtures of separate components and are not true composites. Admixtures are relatively easily separable into the constituent parts and, once separated, the component parts display the individual properties of the components. A true composite resists separation and displays enhanced and often different properties of the input materials whereas the individual input materials often do not display the enhanced properties. A true composite does not display the properties of the individual components but displays the unique character of the composite as a whole.

SUMMARY

Embodiments herein relate to composites including a polymer phase and a dispersed mixed particulate phase comprising a mixed particulate. The mixed particulate can include a portion of a reinforcing fiber (including, but not limited to cellulosic or wood fibers) and a portion of particles such as, but not limited to, hollow glass microspheres, glass particles, mineral or ceramic particulates. Embodiments herein also include methods of making and using the composite as well as applications of the materials.

In various embodiments, a composite material is included. The composite material including about 10 to 80 wt. % of a polymer phase, the polymer phase comprising a thermoplastic polymer with a density of less than about 1.9 g-m$^{-3}$, and about 20 to 90 wt. % of a dispersed mixed particulate phase, the dispersed mixed particulate phase comprising a mixed particulate and about 0.005 to 8 wt. % of a coating of at least one interfacial modifier. The mixed particulate can include a portion of a reinforcing fiber and a portion of a particle. The composite material can have a Young's modulus of greater than 700 MPa.

In some embodiments, the material of the invention can be provided through a selection of nonmetallic particle specie, particle size ($P_s$) distribution, molecular weight, and viscoelastic character and processing conditions. The particles can have a specific and novel particle morphology that cooperates with the components of the invention to provide the needed properties to the composite. The material can attain adjustable chemical/physical properties through particle selection and polymer selection. The resulting composite materials can exceed the contemporary composites in terms of various properties such as density, surface character, reduced toxicity, improved malleability, improved ductility, improved viscoelastic properties (such as tensile modulus, storage modulus, elastic-plastic deformation and others) vibration or sound, structural strength and/or machine molding properties. In various embodiments, the packing of the selected particle sizes ($P_s$, $P_s^1$, etc.), distribution population particles and the selection of the particulate or mixed non-metal, inorganic, ceramic or mineral particulate, can be used to obtain enhanced properties. The materials of the invention are well suited for many applications, including, but not limited to, the manufacture of decorative and structural members used in building applications as well as in additive manufacturing systems as a filament or other type of feedstock.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

BRIEF DESCRIPTION OF THE DRAWINGS

The invention may be more completely understood in connection with the following drawings, in which:

FIGS. 3A-3B show a cross-sectional view of siding members made using a composite in accordance with various embodiments herein.

FIG. 4 shows a cross sectional view of a further embodiment of a siding member.

Figure 1A:
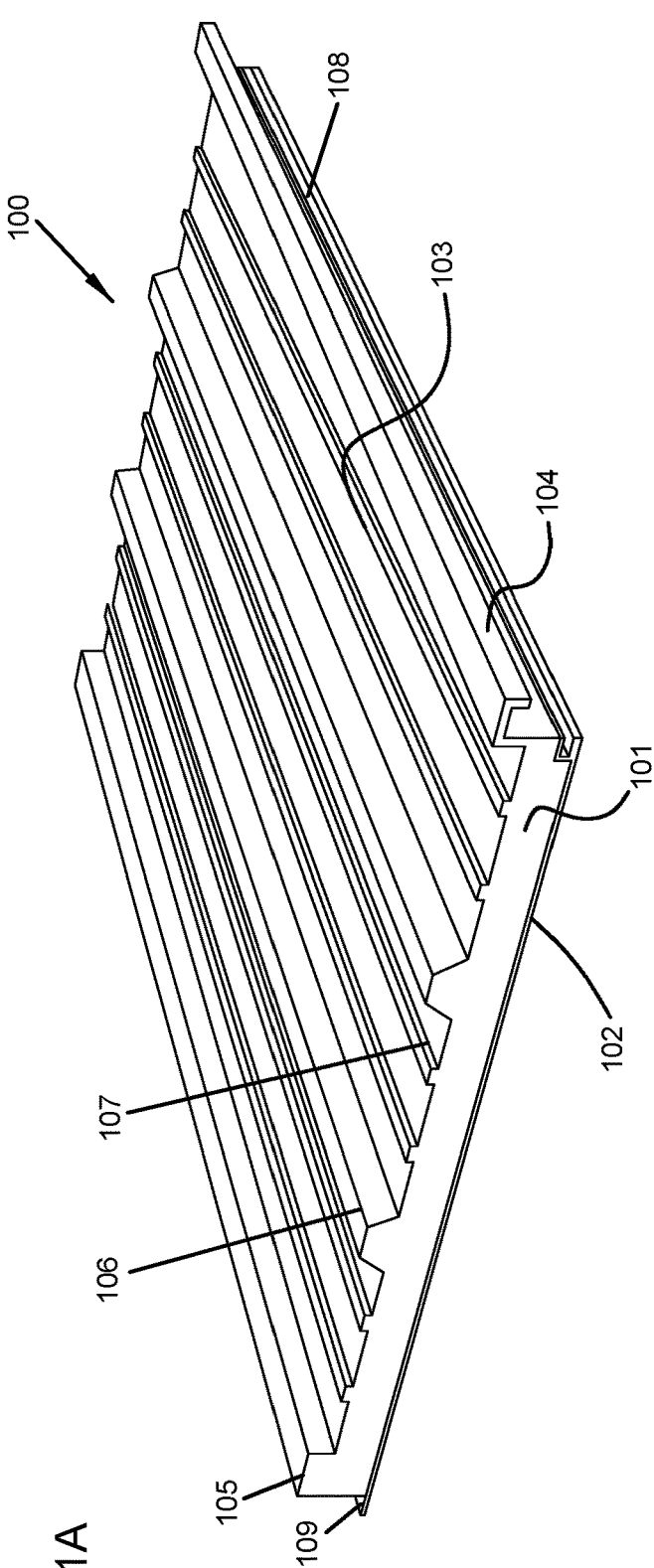
FIGS. 1A and 1B show a building panel in accordance with various embodiments herein.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The embodiments described herein are not intended to be exhaustive or to limit the invention to the precise forms disclosed in the following detailed description. Rather, the embodiments are chosen and described so that others skilled in the art can appreciate and understand the principles and practices.

It is desirable to have a material that has beneficial properties including one or more of tunable density, reduced toxicity, improved distortion under thermal and mechanical stress, improved ductility, improved viscoelastic properties (such as tensile modulus, storage modulus, elastic-plastic deformation and others) electrical/magnetic properties, structural properties and/or machine molding properties with substantially reduced wear on processing equipment.

As described above, polymer materials have been combined with cellulosic fiber to make extruded materials. However, these materials have not been true composites and thus do not provide the beneficial properties of a true composite. Thus, while a substantial amount of work has been done regarding composite materials generally, the use of a dispersed fiber, with nonmetallic particles (such as glass particles, hollow glass spheres, glass micro-bubbles, or mineral particles) in a polymer phase to produce a true composite material has not been previously obtained.

Embodiments herein relate to novel composites made by combining a polymeric phase and a mixed dispersed particulate phase comprising a reinforcing fiber (such as a cellulosic or wood fiber), a particulate(s) (such as a hollow glass microsphere, a glass particle, a mineral or a ceramic), and an interfacial modifier. In one embodiment these components provide a structural composite having improved and novel properties, for example, for structural requirements for permanent as well as temporary buildings and to achieve novel physical electrical surface and viscoelastic properties. Further, the novel composites can be used as a filament, feedstock, for additive manufacturing (AM) solutions, commonly called 3-D or 3 dimensional printing, is used for the creation of parts used in the processes of designing and manufacturing products and for the direct manufacture of end-user parts. In one aspect, AM systems utilize fused deposition modeling (FDM) and inkjet-based, for example PolyJet™ technologies, to enable the production of prototypes and tools used for production and manufactured goods directly from three-dimensional (3D) CAD files or other 3D content. Desktop 3D printers, such as for example MAKERBOT® REPLICATOR® 2 or other similar types of printers, for idea and design development, and a range of systems for rapid prototyping, and production systems for direct digital manufacturing under the uPrint, Mojo, Objet, Dimension, Fortus, and Solidscape brands for larger types of printers for additive manufacturing. AM or 3-D printing solutions are used in the aerospace, apparel, architecture, automotive, business machines products, consumer, defense, dental, electronics, educational institutions, heavy equipment, jewelry, medical, and toys industries.

In an embodiment the composite material uses a proportion of cellulosic fiber in the mixed dispersed particulate phase. The cellulosic fiber commonly comprises fibers having a high aspect ratio made of cells with cellulosic cell walls. In one aspect, the aspect ratio can be in a range of 1:100 that can include mixtures of many aspect ratios from 1:1, 1:1.5, 1:3, 1:10, 1:50, and/or 1:100, wherein any of those ratios can form the lower or upper bound of a range describing the aspect ratio. During the composite forming process of the embodiment, the cell walls, lumen, and cellulosic fiber are not substantially compressed and interfacial modifiers, but not polymers, are introduced into the interior void volume of the cellulosic wood fiber cells. In some embodiments, the viscosity of the interfacial modifier can be relatively low, which allows for penetration into the lumen of the cellulosic fiber. It is believed that coating of the lumen interior of cellulosic fibers reduces the friction of the interior surface of fiber permitting smaller glass beads or smaller hollow glass spheres to embed within the lumen of the fiber. This aspect of the composite formation is believed to be in contrast to the past technology where the polymer material did invest and substantially permeate the wood fiber internal structure such as the lumen.

The cellulosic material for the fiber particulate portion of the composite material may be derived from a variety of sources including hard and soft wood products and by-products, sugar cane, cotton, flax and other known sources of cellulosic materials. In an embodiment, pine is a source of cellulosic material. In another embodiment, maple is a source of cellulosic material. Mixtures of cellulosic material for the fiber portion, such as, for example, hardwood or soft wood blends, or wood fiber with other fiber such as cotton or flax, of the composite are contemplated as being useful embodiments. A source of cellulosic fiber comprises wood fiber, which can be a product or by-product of the manufacture of lumber or other wood products.

A portion of spherical hollow glass microsphere particulate having a particle size ranging from about 10 microns to about 1,500 microns may be used in the dispersed particulate phase of the composite material. Other useful sizes of hollow glass microspheres are 10 to 100μ, 10 to 75μ, 10 to 50μ, or 10 to 25μ. The smaller hollow glass microspheres may permeate and migrate into the lumen of the cellulosic fiber. The maximum size is such that the particle size ($P_s$) of the particle is less than 20% of either the least dimension or the thinnest part under stress in a shaped article. Such particles can be substantially hollow and spherical.

Both thermoplastic and thermosetting resins can be used in various embodiments. Such resins are discussed in more detail below. In the case of thermoplastic resins, the composites are specifically formed by blending the particulate with an interfacial modifier prior to mixing with thermoplastic polymer and then forming the material into a finished composite, such as a pellet comprising an interfacially modified wood fiber coated surface and an interfacially modified glass particle coated surface associating with, but not covalently bonding to, the polymer. Thermosetting composites are made by coating the particulate with interfacial modifier with an uncured material and then curing the material into a finished composite material such as a pellet.

The fiber and particulate material(s) can be coated with an interfacial surface chemical treatment that supports or enhances the final properties of the composite. The interfacial modifier coating provides a new surface on the wood fiber particulate and other particulate, for example, hollow glass microsphere, glass bead, inorganic mineral, metal, or ceramic material. This new surface on the particulate has a designed minimal interaction or reactivity with the polymer or polymers of the polymer phase of the composite and, in an embodiment, this surface provided by the interfacial modifier enables the fiber and the particulate portions to become immiscible within the polymer phase. The interfacial modifier on the surface of the particulate enables the particulate bulk to interact with the polymer and other particulate portions exclusively at the interfaces of said particulate and said polymer. In one aspect the individual glass and cellulosic particulates may slide among each other at the interfaces. In another aspect the individual particulates may self-order themselves to obtain very high packing density within the polymer phase. In another aspect the particulate portion may migrate and self-order within the lumen of the cellulosic fiber. Particulate within the lumen of the cellulosic fiber enables the fiber to retain the benefits of its fiber structure and provides attributes, such as for example, resilience, unique acoustical properties, thermal properties such as insulation, electrical properties such as insulation, impact properties etc. to the composite material as an entity. This property of the interfacially modified surface on the particulate and wood fiber phases allows the composite to be tuned or modified to have specific properties of either the particulate, wood fiber or polymer depending on the final application or use of the composite material.

A composite is more than a simple admixture of different types of material. A composite is defined as a combination of two or more substances intermingled in various percentages of the composition, in which each component of the composition results in properties that are additive or superior to those of the separate constituents of the composite. In a simple admixture the mixed material has little interaction and little property enhancement. For example, in a composite one of the materials may be chosen to increase or decrease stiffness, fiber reinforcement, strength or to vary density of the resulting composite material.

Atoms and molecules can form bonds with other atoms or molecules using a number of mechanisms. Such bonding can occur between the electron cloud of an atom or molecular surfaces including molecular-molecular interactions, atom-molecular interactions and atom-atom interactions. Each bonding mechanism involves characteristic forces and dimensions between the atomic centers even in molecular interactions. The important aspect of such bonding force is strength, and the variation of bonding strength over distance and directionality. The major forces in such bonding include ionic bonding, covalent bonding and the van der Waals' (VDW) types of bonding.

Ionic radii and bonding occur in ionic species such as $Na^+Cl^-$, $Li^+F^-$. Such ionic species form ionic bonds between the atomic centers. Such bonding is substantial, often substantially greater than 100 $kJ\text{-}mol^{-1}$ often greater than 250 $kJ\text{-}mol^{-1}$. Further, the interatomic distance for ionic radii tend to be small and on the order of 1-3 Å.

Covalent bonding results from the overlap of electron clouds surrounding atoms forming a direct covalent bond between atomic centers. The covalent bond strengths are substantial, are roughly equivalent to ionic bonding and tend to have somewhat smaller interatomic distances.

The varied types of van der Waals' forces are different than covalent and ionic bonding. These van der Waals' forces tend to be forces between molecules, not between atomic centers. The van der Waals' forces are typically divided into three types of forces including dipole-dipole forces, dispersion forces and hydrogen bonding.

TABLE 1

Summary of Chemical Forces and Interactions

| Type of Interaction | Strength | Bond Nature | Strength Proportional to: |
|---|---|---|---|
| Covalent bond | Very strong | Comparatively long range | $r^{-1}$ |
| Ionic bond | Very strong | Comparatively long range | $r^{-1}$ |
| Ion-dipole | Strong | Short range | $r^{-2}$ |
| VDW Dipole-dipole | Moderately strong | Short range | $r^{-3}$ |
| VDW Ion-induced dipole | Weak | Very short range | $r^{-4}$ |
| VDW Dipole-induced dipole | Very weak | Extremely short range | $r^{-6}$ |
| VDW London dispersion forces | Very weak[a] | Extremely short range | $r^{-6}$ |

[a]Since VDW London forces increase with increasing size and there is no limit to the size of molecules, these forces can become rather large. In general, however, they are very weak.

Dipole-dipole forces arise by the separation of charges on a molecule creating a generally or partially positive and a generally or partially negative opposite end. The forces arise from electrostatic interaction between the molecule negative and positive regions. Hydrogen bonding is a dipole-dipole interaction between a hydrogen atom and an electronegative region in a molecule, typically comprising an oxygen, fluorine, nitrogen or other relatively electronegative (compared to H) site. These atoms attain a dipole negative charge attracting a dipole-dipole interaction with a hydrogen atom having a positive charge. Dispersion force is the van der Waals' force existing between substantially non-polar uncharged molecules. While this force occurs in non-polar molecules, the force arises from the movement of electrons within the molecule. Because of the rapidity of motion within the electron cloud, the non-polar molecule attains a small but meaningful instantaneous charge as electron movement causes a temporary change in the polarization of the molecule. These minor fluctuations in charge result in the dispersion portion of the van der Waals' force.

Such VDW forces, because of the nature of the dipole or the fluctuating polarization of the molecule, tend to be low in bond strength, typically 50 kJ mol$^{-1}$ or less. Further, the range at which the force becomes attractive is also substantially greater than ionic or covalent bonding and tends to be about 3-10 Å.

In an embodiment, we have found that the unique combination of wood fiber particulate, the varying but controlled wood fiber and particle size within the particle and fiber components of the particulate phase, and the modification of the interaction between the wood fiber and the particulate phase and the polymer phase, result in the creation of a unique van der Waals' bonding. The van der Waals' forces arise between particulate atoms/crystals in the particulate/fiber and the polymers are created by the combination of particulate size, polymer and interfacial modifiers in the composite.

In the past, materials that are characterized as "composite" have merely comprised a polymer filled with particulate with little or no van der Waals' interaction between the particulate filler material. In Applicants' embodiment, it is believed the interaction between the selection of wood fiber size, inorganic particle size distribution with the interfacially modified particulate and interfacially modified wood fiber particulate enables the wood fiber and particulate phase to achieve an intermolecular distance that creates a substantial van der Waals' bond strength. The current state of the art materials, having minimal if any viscoelastic properties, do not achieve such a true composite structure. This leads us to conclude that this intermolecular distance is not attained in the current state of the art. In the discussion above, the term "molecule" can be used to relate to a particle or particulate, a particle comprising non-metal crystal, a glass bead, a glass microsphere, a hollow glass microsphere, wood fiber or an amorphous aggregate, among other molecular or atomic units or sub-units of fibers, non-metal or inorganic mixtures. In the composites of the embodiments, the van der Waals' forces occur between collections of atoms that act as "molecules" in the form of mineral, inorganic, cellulosic or non-metal atom aggregates.

The composite material can be characterized by a composite having intermolecular forces between particles is about 30 kJ-mol$^{-1}$ and a bond dimension of 3-10 Å. The particulate in the composite material of the embodiment has a range of particle sizes such that about at least 5 wt.-% of particulate are in the range of about 10 to 500 microns and about at least 5 wt.-% of particulate are in the range of about 10 to 250 microns, and a polymer, the composite having a van der Waals' dispersion bond strength between molecules in adjacent particles of less than about 4 kJ-mol$^{-1}$ and a bond dimension of 1.4 to 1.9 Å or less than about 2 kJ-mol$^{-1}$ and the van der Waals' bond dimension is about 1.5 to 1.8 Å.

In an embodiment, the dispersed and mixed particulate phase with at least a portion of glass particulate and a portion of fiber particulate is usually much stronger and stiffer than the polymer matrix. The dispersed and mixed particulate phase gives the composite material its good properties such as, for example, reinforcement and structural properties. The polymer matrix holds the reinforcing particulate in an orderly high-density pattern. Because the reinforcing particulates are usually discontinuous, the matrix also helps to transfer load among the particulates. The reinforcing particulates, such as for example, fibers and particles, can be used in a wide variety of shaped articles made from the composite material, such as for example, building panels. In an embodiment, the composite material can be shaped into replacement structures or reinforcing components for other materials such as, for example, lumber, metal, or concrete. The processing can aid in the mixing of the reinforcement particulate. The dispersed and mixed particulate phase may comprise greater than about 10 wt. %, greater than about 15 wt. %, greater than about 20 wt. % or about 15 wt. %-65 wt. % of the composite. To aid in the mixture, an interfacial modifier can help to overcome the forces that prevent the matrix from forming a substantially continuous phase of the composite.

In an embodiment the dispersed mixed particulate phase may range from about 15.0 to 90.0 wt. % from about 15.0 to 80.0 wt. %, from about 15.0 to 70.0 wt. % of the composite. In one embodiment, the dispersed mixed particulate phase is at least about 40 vol. %, at least about 50 vol. %, at least about 60 vol. %. In an embodiment the hollow glass, or solid glass microsphere particulate may range from 20.0 to 80.0 vol. % of the composite and the wood fiber particulate from 80.0 to 20.0 vol. %. In an embodiment within the mixed particulate phase, the hollow glass or solid microsphere or bead particulate may range from 5.0 to 90.0 vol. % of the particulate phase and the wood fiber particulate from 95.0 to 10.0 vol. %.

In an embodiment of a high volume fraction particle phase, on the high end of particle loading and density, for example, such as, 85 vol. % in the polymer with 90 vol. % being a solid glass spherical particle, there could be as high as 92 wt. % particle fraction.

In an embodiment of a low density volume fraction particle phase, on the low end of particle loading and density for example, such as, 40 vol. % particle in the polymer with 90% being a low density hollow glass microsphere of 0.2 g/cc density, there could be as low as 15 wt. % particle fraction.

The composite properties arise from the intimate association of the polymer and particulate obtained by use of careful processing and manufacture. An interfacial modifier is an organic material, in some examples an organo-metallic material, that provides an exterior coating on the particulate to provide a surface that can associate with the polymer promoting the close association of polymer and particulate but with no reactive bonding, such as covalent bonding for example, of polymer to particulate, particulate, such as fiber, to a different particulate, such as a glass particle or a glass bubble. In one embodiment, the coating of interfacial modifier at least partially covers the surface of the particulate. In another embodiment, the coating of interfacial modifier continuously and uniformly covers the surface of the particulate, in a continuous coating phase layer. Minimal amounts of the modifier can be used including about 0.005 to 8 wt.-%, about 0.02 to 6.0, wt. %, about 0.02 to 3.0 wt. %, about 0.02 to 4.0 wt. % or about 0.02 to 5.0 wt. %.

Interfacial modifiers used in the application fall into broad categories including, for example, stearic acid derivatives, titanate compounds, zirconate compounds, hafnium compounds, samarium compounds, strontium compounds, neodymium compounds, yttrium compounds, phosphonate compounds, aluminate compounds. Aluminates, phosphonates, titanates and zirconates useful contain from about 1 to about 3 ligands comprising hydrocarbyl phosphate esters and/or hydrocarbyl sulfonate esters and about 1 to 3 hydrocarbyl ligands which may further contain unsaturation and heteroatoms such as oxygen, nitrogen and sulfur. Preferably the titanates and zirconates contain from about 2 to about 3 ligands comprising hydrocarbyl phosphate esters and/or hydrocarbyl sulfonate esters, preferably 3 of such ligands and about 1 to 2 hydrocarbyl ligands, preferably 1 hydrocarbyl ligand.

In one embodiment the interfacial modifier that can be used is a type of organo-metallic material such as organo-cobalt, organo-irons, organo-nickels, organo-titanate, organo-aluminates, organo-strontium, organo-neodymium, organo-yttrium, or organo-zirconates. The specific type of organo-titanate, organo-aluminates, organo-strontium, organo-neodymium, organo-yttrium, organo-zirconates which can be used and which be referred to as organo-metallic compounds are distinguished by the presence of at least one hydrolysable group and at least one organic moiety. Mixtures of the organo-metallic materials may be used. The mixture of the interfacial modifiers may be applied inter- or intra-particle, which means at least one particle may has more than one interfacial modifier coating the surface (intra), or more than one interfacial modifier coating may be applied to different particles or particle size distributions (inter). These types of compounds may be defined by the following general formula:

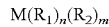

wherein M is a central atom selected from Ti, Al, and Zr; $R_1$ is a hydrolysable group; $R_2$ is a group consisting of an organic moiety; wherein the sum of m+n must equal the coordination number of the central atom and where n is an integer $\geq 1$ and m is an integer $\geq 1$.

Particularly $R_1$ is an alkoxy group having less than 12 C atoms. Other useful groups are those alkoxy groups, which have less than 6 C, and alkoxy groups having 1-3 C atoms. $R_2$ is an organic group including between 6-30, preferably 10-24 carbon atoms optionally including one or more hetero atoms selected from the group consisting of N, O, S and P. $R_2$ is a group consisting of an organic moiety, which is not easily hydrolyzed and often lipophilic and can be a chain of an alkyl, ether, ester, phospho-alkyl, phospho-alkyl, phospho-lipid, or phospho-amine. The phosphorus may be present as phosphate, pyrophosphato, or phosphito groups. Furthermore, $R_2$ may be linear, branched, cyclic, or aromatic.

For purposes of this disclosure, wood fiber, in terms of abundance and suitability, can be derived from either soft woods or evergreens or from hard woods commonly known as broad leaf deciduous trees as described in U.S. Pat. No. 5,441,801, herein incorporated by reference in its entirety. Hard woods or soft wood are useful in the embodiments. Soft woods are characterized by fibers that are longer; contain high percentages of lignin and lower percentages of hemicellulose than hard woods. While soft wood may be a source of fiber, additional fiber make-up can be derived from a number of secondary or fiber reclaim sources including bamboo, rice, sugar cane, and recycled fibers from newspapers, boxes, computer printouts, etc.

However, the primary source for wood fiber comprises the wood fiber by-product of sawing or milling soft woods such as sawdust or milling tailings. Such wood fiber has a regular reproducible shape and aspect ratio. The fibers based on a random selection of about 100 fibers are commonly at least 3 mm in length, 1 mm in thickness and commonly have an aspect ratio ranging from 1:3 to 1:8, or higher. Preferably, the fibers are 1 to 10 mm in length, 0.3 to 1.5 mm in thickness with an aspect ratio between 2 and 7, preferably 2.5 to 6.0. In other embodiment the size of the wood fibers may be at least 75, 106, 150 or 425 microns in length. Moisture content of the wood fiber will range from 4%, 5%, 6%, 7%, 8%, 9%, 10% 11%, or 12% depending on the species. Bulk density ranges from 0.128, 0.160, 0.192, 0.224, 0.256, and 0.288 to 0.320 g/cm$^3$ depending on species.

The fibers are derived from processes common in the manufacture of wood products such as, for example, windows and doors. Wooden members are commonly ripped or sawed to size in a cross grain direction to form appropriate lengths and widths of wood materials. The by-product of such sawing operations is a substantial quantity of sawdust. In shaping a regular shaped piece of wood into a useful milled shape, wood is commonly passed through machines which selectively remove wood from the piece leaving the useful shape. Lastly, when shaped materials are cut to size and mitered joints, butt joints, overlapping joints, mortise and tenon joints are manufactured from pre-shaped wooden members, substantial waste trim is produced. Such large trim pieces are commonly cut and machined to convert the larger objects into wood fiber having dimensions approximating sawdust or mill tailing dimensions. The wood fiber can be blended regardless of particle size and used to make the composite. The fiber stream can be pre-sized to a range or can be sized after blending. Further, the fiber can be pre-pelletized before use in composite manufacture.

Such sawdust material can contain substantial proportions of waste stream by-products. Such by-products include waste polyvinyl chloride or other polymer materials that have been used as coating, cladding or envelope on wooden members; recycled structural members made from thermoplastic materials; polymeric materials from coatings; adhesive components in the form of hot melt adhesives, solvent based adhesives, powdered adhesives, etc.; paints including water based paints, alkyd paints, epoxy paints, etc.; preservatives, anti-fungal agents, anti-bacterial agents, insecticides, etc.; and other waste streams common in the manufacture of wooden doors and windows.

The total waste stream content of the wood fiber materials is commonly less than 25 wt.-% of the total wood fiber input into the wood fiber composite material. Of the total waste recycle, approximately 10 wt.-percent of that can comprise a vinyl polymer commonly polyvinyl chloride. Commonly, the intentional recycle ranges from about 1 to about 25 wt.-%, preferably about 2 to about 20 wt.-%, or from about 3 to about 15 wt.-% of contaminants based on the sawdust. The sawdust preferably has a density of 0.15 g/cc to ±0.30 g/cc.

Other fibers, such as glass, boron, carbon, aramid, metal, polyester, nylon, etc. for example, are contemplated as additives to provide other characteristics to the wood fiber and glass bubble composite. These fibers may be either used in addition, as reinforcement as additional fibers, or as replacement fibers for the wood fiber or glass bubble component of the composite material. These fibers can be coated with interfacial modifier. These other fibers may provide additional structural support or other functional aspects to support particular uses. Examples of other uses are as building protection such as, for example, from the environment (e.g. wind, rain, snow, temperature, heat, etc.) or stresses (e.g. earthquake, electromagnetic radiation, projectiles, etc.). Optionally, some of these fibers may be coated with the interfacial modifier depending on the end purpose of the shaped article or composite material.

For the purpose of this disclosure, the "dispersed mixed particulate phase" of the composite material refers to a fiber and a particle being present in the composite material. The function of interest for the dispersed mixed particulate phase to determines the proportion of the fiber and the portion of the inorganic particle. A portion of fiber may be at least 10%, 20%, 30%, 40%, or 50% of volume or weight fraction of the dispersed mixed particulate phase, and a portion of inorganic particle may be at least 5%, 10%, 20%, 30%, or 40%. The function of interest, in an embodiment a structural composite, determines the portions of the fiber and inorganic particulate within the dispersed mixed particulates Regarding the particulate material, the term a "majority of the particulate" indicates that while the particulate can contain some small amount of small fines and some particles that are large with respect to the recited range, the majority (greater than 95%, 90%, 85%, etc.) fall within the recited range and contribute to the physical properties of the composite.

Glass particulate, as described in published U.S. Patent Application 2010/0279100, commonly owned by assignee, and herein incorporated by reference in its entirety, can be combined with a second particulate such that the second particle differs from the glass by at least ±5 microns, or has a particle size such that according to the formula $P_S \geq 2 P_S^1$ or $P_S \leq 0.5 P_S^1$ wherein $P_S$ is the particle size of the hollow glass microsphere and $P_S^1$ is the particle size of the particulate.

For the purposes of this disclosure, the term "aspect ratio" is defined as length/diameter, or L/D, of one fiber.

For the purpose of this disclosure, the term "inorganic" relates to a material substantially free of carbon in the form or organic carbon or covalently bonded carbon compounds. Accordingly, compounds such as calcium carbonate or sodium bicarbonate are considered inorganic materials while most organic compounds including small molecules such as methane, ethane, ethylene, propylene, related polymer species, etc., are commonly considered organic materials.

For the purpose of this disclosure, the term "particle" and "particulate" are largely synonymous relate to a material that is substantially different than the polymer phase. "Particle" and "particulate" are used in this disclosure to relate to fiber (wood, synthetic, metal or natural) and to materials such as metals, minerals, ceramics, synthetic beads or synthetic hollow spheres or microsphere. In a packed state, this particulate has an excluded volume of about 13 to 61 vol.-% or about 30 to 75 vol.-%. Alternatively, the particulate can have greater than about 30 vol. %, greater than about 40 vol. % or about 40 to 70 vol.-% particle loading. In the embodiments, the particulate can comprise two, three or more particulates sources, in a blend of materials of differing chemical and physical nature. Such materials may have a range of sizes for 10 to 4000 microns and may be used in combination with the wood fiber particulate.

For the purpose of this disclosure the term "profile" refers to the shape of a decorative or structural component that is made by extruding the composite material through a die that has an opening of the "profile" shape or made by injection molding the composite material to have the "profile" shape.

For the purpose of the disclosure the term "fenestration" refers to any opening in a building for human habitation that can be used as a window or door or as an installation location for a window or door For the purpose of this disclosure the term "module, enclosure or hut" refers to a protected and useful place for human activity.

For the purpose of this disclosure the term "panel" refers to a generally planar component of a structure derived from the composite that can be used as a structural or decorative component. Such panels can be used as a decorative siding or as a load bearing structural member.

Particle Morphology Index

The interfacial modification technology depends on the ability to isolate the particles or particulate from that of the continuous polymer phase. The isolation of the particulates requires placement of a continuous molecular layer(s) of interfacial modifier to be distributed over the surface of the particles. In an embodiment, the interfacial modifier would be distributed over all or part of the surface of the wood fiber and the surface of a solid or hollow glass microsphere. Once this layer is applied, the behavior at the interface of the interfacial modifier to polymer dominates the physical properties of the composite (e.g. tensile, rheology, viscosity, and elongation behavior) while the bulk nature of the particle dominates the bulk material characteristics of the composite (e.g. density, thermal conductivity, compressive strength, structural strength). The correlation of particulate bulk properties to that of the final composite is especially strong due to the high volume percentage loadings of particulate phase associated with the technology.

There are two key attributes of the particle surface that dictate the ability to be successfully interfacially modified: 1) The overall surface area of the particles on a large scale; large being defined as about 100× or more compared to the molecular size of the interfacial modifier, and 2) particle surface characteristics that are on the order of the size, characteristics, and properties of the interfacial modifier being applied.

The following particle morphology attributes specifically contribute to the ability to effectively interfacially modify the particles. Combining the different particle attributes we have derived a particle morphology index. Discussion will reveal that vastly different particle types can be effectively modified from large, smooth, round, and impervious surface types (low particle morphology index) to small, rough, irregular and porous (high particle morphology index):

Particle Size ($P_s$)

A wide range of glass (e.g. beads, spheres, hollow glass bubbles, etc.) or other particle (e.g ceramic or mineral) can be effectively interfacially modified. Successful modification has been completed with particles with a major dimension as small as −635 US mesh (<20μ) to particles as large as −40US mesh (−425μ). Undoubtedly, larger particle sizes can be effectively modified (1,500μ or greater). The absolute size of the particle being modified is not important; the relative size of the major dimension of the largest particle to the minimum critical dimension of the end article is more important. Our composite experience guides us that the major dimension of the largest particles should not be more than ⅕th (20%) of the minimum critical dimension of the end article.

As the particles become smaller the particulate surface area increases. For smooth spheres of a constant density, there is 28 times more surface area in spheres of 15 μm than 425 μm diameter within a given mass of material. There is 100 times the surface area for particles of 15 μm diameter compared to 1500 μm.

Dosage levels of interfacial modifier have been effectively adjusted to compensate for changes in surface area due to particle size shifts.

Particle Shape/Aspect Ratio ($P_{sh}$)

The benefit of interfacial modification is independent of overall particle shape. Particles with an aspect ratio of 1 (hollow glass bubbles of iM30K and ceramic G200 microspheres from 3M, solid glass beads 2429A, 3000A or 5000a from Potters) to 10 (some particularly irregularly shaped garnet) have been favorably interfacially modified. In other embodiments, the aspect ratio of the particulate can be in a range of 1:100 that can include mixtures of many aspect ratios from 1:1, 1:1.5, 1:3, 1:10, 1:50, and/or 1:100, wherein any of those ratios can form the lower or upper bound of a range describing the aspect ratio. In an embodiment, particulate comprising hollow glass bubbles, ceramic microspheres, or solid glass beads/particles may range in average sizes from 1 to 12μ, 7 to 10μ, 9 to 30μ, 30 to 50μ, or 70 to 100μ depending on the source and size distribution of the of the particulate. The current upper limit constraint is associated with challenges of successful dispersion of fibers within laboratory compounding equipment without significantly damaging the high aspect ratio fibers. Furthermore, inherent rheological challenges are associated with high aspect ratio fibers. With proper engineering, the ability to successfully compound and produce interfacially modify fibers of fiber fragments with aspect ratio in excess of 1:100 is envisioned.

At a given minor axis particle dimension, the relationship of particle aspect ratio to surface area is determined, using a two dimensional profile, is given by:

$$Sphere = \pi D^2; \text{ and}$$

$$ARobject = \pi D^2(r_a + 0.5);$$

wherein D is particle size ($P_s$) or diameter, $r_a$ is aspect ratio.

For a given minor dimension, the surface area of a particle with an aspect ratio of 10 has 10.5 times the surface area than a spherical particle. Dosage levels of interfacial modifier can be adjusted to compensate for the variance in surface area due to shape effects.

Particle roughness ($P_r$)

Macroscopic particle roughness (defined here as 100× the diameter of the interfacial modifier) can be defined by the circularity of the particle. It has been shown that interfacially modified surfaces of wood fiber, mineral or inorganic particulates with rough and substantially non-spherical shapes obtain the similar advantageous rheology and physical property results as regularly shaped particles. The circularity or roughness of the particle can be measured by microscopic inspection of the particles in which an automated or manual measurement of roughness can be calculated. In such a measurement, the perimeter of a representative selection of the particulate is selected and the area of the particle cross section is also measured. The circularity of the particle is calculated by the following formula:

$$Circularity = (perimeter)^2/area.$$

Such materials such as hollow glass bubbles or solid glass beads have a circularity of 4π (for smooth spherical particles) to 50 (smooth particles with an aspect ratio of 10). Many of wood fiber, inorganic and mineral particulate have an oblong, multi lobe, rough non-regular shape or aspect. Such materials have a circularity of about 13 to 40, about 13.6 to 40, about 13 to 35 or about 13 to 30 and obtain the improved viscoelastic properties of the composite material. Using proper optical and image analysis techniques the decoupling of surface roughness and aspect ratio can be determined under the appropriate magnification to quantify large scale particle roughness. The multiplier for the derivation of the particle morphology index may be adjusted for the aspect ratio of the particle.

An alternative to optical procedures consists of using a BET analysis to determine the specific surface area of the particulate phase. The specific surface area captures both the macroscopic particle roughness and particle porosity discussed below for particles of a specific particle size and shape distribution.

Particle Porosity ($P_p$)

The molecules of interfacial modifiers are quite large, on the order of a few hundred to a few thousand molecular weight. Within a class of compounds, the effective diameter of the modifier molecule is proportional to the molecular weight. The predicted diameter of the NZ-12 zirconate modifier is 2260 picometer with a molecular weight of 2616 g/mol. The minimum size of the modifier molecules would be about 400 picometer (assuming a molecular weight of 460 g/mol). The size of the titanate modifiers would be slightly smaller than the corresponding zirconate for a corresponding given organophosphate structure.

Literature review of BET surface analysis reveals a large difference in particle surface area of particles such as, for example, glass, ceramic or mineral particles (from 0.1 to >100 m$^2$-g$^{-1}$). Nonporous spheres with a diameter of 1,500 microns results in a specific area of 0.017 m$^2$-g$^{-1}$. Successful interfacial modification of the particulates is possible via changes in modifier loading. It is important to note that required increase in dosage is not directly proportional to the BET surface measurements. The pore size penetrable by the BET probing gas is significantly smaller (20.5 A$^2$ for krypton for example) than the interfacial modifier. Silica sand had a pore size of 0.90 nm as determined by BET analysis, the interfacial modifier molecule is able to bridge the pore opening. It will be possible to successfully interfacially modify porous absorbents such that the particles composite rheology is improved while absorbent properties of the particulate are maintained due to the relative size differences in the interfacial modifier (large), pore size being bridged (small), and the size of the absorbent molecule (nitrogen, argon, water, etc.) diffusing through the interfacial modifier into the absorbent particulate.

The particle morphology index is defined as:

$$PMI = (P_s)(P_{sh})(P_r)(P_p)$$

For large, spherical, smooth, non-porous particles the particle morphology index=1 to 200. For small, rough, porous particles with an aspect ratio of 10, the maximum particle morphology index=100×10.5×100/0.1=10$^6$. Certain particles with a range of particle size ($P_s$) or diameters and aspect ratios, some roughness and porosity can range from 200 to 10$^4$. Other particles with a broadened range of sizes or diameters and aspect ratios, substantial roughness and increased porosity can range from 2×10$^4$ to 10$^6$. The amount of interfacial modifier increases with the particle morphology index.

The result of the above particle attributes (particle size and distribution, particle shape, and roughness) results in a specific particle packing behavior. The relationship of these variables leads to a resultant packing fraction. Packing fraction is defined as:

$$P_f = P_d/d_{pync}$$

wherein $P_f$=packing fraction; $P_d$=packing density and $d_{pync}$=pyncnometer density. The relationship of these variables upon particle packing behavior is well characterized and used within powdered metallurgy science.

It is believed for the case of spherical particles that particle packing increases when the size difference between large to small particles increases. With a size ratio of 73 parts by weight large particle: 27 parts by weight small, monodispersed spheres with a 7:1 size ratio, the small particles can fit within interstitial spaces of the large particles resulting in a packing level of about 86 volume percent. In practice, it is not possible to attain mono-dispersed spheres. We have found that increased packing is best when using particles of broad particle size distribution with as large of a size difference between them as possible. In cases like these, we have found packing percentages approaching 80 volume %.

For composites containing high volumetric loading of spherical particles, the rheological behavior of the highly packed composites depends on the characteristics of the contact points between the particles and the distance between particles. When forming composites with polymeric volumes approximately equal to the excluded volume of the particulate phase, inter-particle interaction dominates the behavior of the material. Particles contact one another and the combination of interacting sharp edges, soft surfaces (resulting in gouging) and the friction between the surfaces prevent further or optimal packing.

Interfacial modifying chemistries are capable of altering the surface of the particulate by coordination bonding, van der Waals forces, covalent bonding, or a combination of all three. The surface of the interfacially modified particle behaves as a particle of the interfacial modifier. The interfacially modified surface of the particle and the surface of the fiber in the particulate phase is what the polymer phase of the composite material interacts with, not the bulk aspect or topographical aspect of the particle or fiber itself. In this way the polymer properties, such as viscoelastic properties like, for example, tensile elongation, melt flow, extrusion pressures, flexural properties or Young's modulus, may be made more or less functional depending on the interfacially modified coated particle loadings and the interfacially modified coated fiber particle loadings of the composite material. These interfacially modifying chemistries reduce the friction between particles of both the inorganic particle as well as the fiber preventing gouging among particulate surfaces and allowing for greater freedom of movement between the particles. In another aspect, interfacially modified glass particles, hollow or solid, may enter the lumen of a cellulosic fiber and migrate to the interior of the cellulosic fiber structure. This aspect may lend reinforcement to the fiber structure. In another aspect, a hollow glass sphere may be too large to enter the lumen. In this aspect, the glass sphere, due to the non-attachment or bonding to the polymer, may provide additional rheology properties to the composite material (e.g. shear or viscosity) with respect to temperature and pressure. The benefits of utilizing particles in the aforementioned acceptable particle morphology index range does not become evident until packing to a significant proportion of the maximum packing fraction within the polymer phase becomes a critical packing level. This packing fraction is a function of the multiple particle domains, such as, for example, both cellulosic and glass, in relation to the polymer phase. This packing fraction value is typically greater than approximately 20, 30, or 40 volume %.

The spatial character of the inorganic particles, such as, for example, glass beads or glass bubbles, and fiber of the embodiment can be defined by the circularity of the particle and by the aspect ratio of the fiber. One surprising aspect is that a particle that departs from a smooth spherical particle shape and are non-spherical or a fiber that has a substantial aspect ratio are efficiently packed in the composite material. Mineral or inorganic particulates with amorphous, rough and substantially non-spherical shapes obtain the same advantageous rheology as regularly shaped particles such as glass beads and glass microspheres. The aspect ratio of the more regular fibers can be less than, 1:10, 1:5 and often less than 1:1.5. Similarly, the fibers with an aspect ratio of less than 10 or about 1:5 also obtain the benefits of the composites of the embodiment.

We have found that the use of the interfacial modifier obtains a close association of both spherical and substantially aspherical particles at the interfacial surface of the particles such that effective composites can be made even with particles that depart from the ideal spherical particle. Many inorganic or mineral particles, depending on source and processing can have a narrow particle size distribution, a very regular surface, a low aspect ratio and substantial circularity while other such particles can have a very amorphous non-regular geometry and surface characteristic. Similarly, and surprisingly, fibers of aspect ratios from about 1.5:15.0, to about 1.5:10.0 to about 1.5 to 5.0 have been found to interact favorably with both the spherical and non-spherical particles. The composite material exhibits improved properties such as melt processing as exemplified by melt flow, a high Young's Modulus as well as other properties. In an embodiment for structural applications Young's modulus is greater than about 700 MPa or greater than about 1000 MPa or greater than about 2000 MPa or greater than about 3000 MPa or greater than about 5000 MPa or about 5000 to $2.0 \times 10^6$ MPa. The composite materials made using the interfacial modifier coating can obtain useful properties from the particle species disclosed herein.

In the composites of the embodiment, the van der Waals' forces occur between particles of hollow glass microspheres that act as "molecules" in the form of crystals or other mineral particle aggregates. In various embodiments, the composite material is a composite having intermolecular forces between wood fiber, glass microsphere, non-metal, inorganic or mineral particulates that are in the range of van der Waals' strength, i.e., ranges and definitions if appropriate.

In an embodiment of the composite, the particles of hollow glass microspheres and wood fiber are usually much stronger and stiffer than the polymer phase, and give the composite its designed properties. The polymer phase holds the dispersed mixed particulate phase of the hollow glass microspheres and wood fiber in an orderly high-density pattern. Because the hollow glass microspheres and wood fiber are usually discontinuous, the matrix also helps to transfer load among the wood fiber and hollow glass microspheres.

Processing can aid in the mixing and filling the particles of the hollow glass microsphere and wood fiber into the composite. Observations have determined that, unexpectedly, that at least some of the wood lumen structure is retained throughout the processing steps with the polymer and the interfacially modified particulate such as, for example hollow glass microspheres. We can retain at least 10%, 20%, 30%, 40%, or 50% open cell structure, such as, for example, lumens, rays, or vessels within the wood fiber due to the interaction between the surfaces provided by the interfacial modifier on the particle, such as a spherical hollow glass particle, and the wood fiber in the particulate phase.

If density is a functional use of the composite material, the density may be adjusted by inclusion of appropriate mineral particulate or metal particulate in the dispersed mixed particulate phase. The density of the composite material may be less than about 10.0 g-cm$^3$, less than about 8.0 g-cm$^3$, less than about 7.0 g-cm$^3$, less than about 5.0 g-cm$^3$, less than about 6.0 g-cm$^3$, less than about 4.0 g-cm$^3$, less than about 3.0 g-cm$^3$, less than 1.0 about g-cm$^3$, less than about 0.50 g-cm$^3$. In the material in general, the density can range from 0.5 to 10 g-cm³, the high strength low density material density ranges from 0.5 to 3.0 g-cm³.

To aid in the mixture, a surface chemical reagent, interfacial modifier, can help to overcome the forces that prevent the polymer matrix from forming a substantially continuous phase of the composite. The tunable composite properties arise from the intimate association obtained by use of careful processing and manufacture. The interfacial modifier, such as organometallic compositions, that provides a coating on the particulate promoting the close association of polymer, particulate and fiber without covalent bonding between these compositional components of the composite material. Conceptually the particulate and fiber are immiscible in the polymer phase because of the lack of covalent bonding between the compositional components of the composite material.

Differential amounts, in other words different types, quantities or volumes, of interfacial modifier are not required for a separate coating application of the particulate and fiber. Thus the steps to prepare and to coat the interfacially modified particulate and interfacially modified fiber may be reduced to one step. However, for specialized composites, differential selections of interfacial modifiers for different particle applications may be desirable. In an embodiment the interfacial modifiers may be different and the particles coated with interfacial modifier may be the same or different. Higher amounts of the interfacial modifier may be used to coat materials with increased morphology.

Hollow glass spheres (including both hollow and solid) are a useful non-metal or inorganic particle. These spheres are strong enough to avoid being crushed or broken during further processing of the polymeric compound, such as by high pressure spraying, kneading, extrusion or injection molding. In many cases these spheres have densities close to, but more or less, than that of the polymeric compound into which they are introduced in order that they distribute evenly within the compound upon introduction and mixing. Furthermore, it is desirable that these spheres be resistant to leaching or other chemical interaction with their associated polymeric compound. The method of expanding solid glass particles into hollow glass spheres by heating is well known. See, e.g., U.S. Pat. No. 3,365,315 herein incorporated by reference in its entirety. Glass is ground to particulate form and then heated to cause the particles to become plastic and for gaseous material within the glass to act as a blowing agent to cause the particles to expand. During heating and expansion, the particles are maintained in a suspended state either by directing gas currents under them or allowing them to fall freely through a heating zone. Useful glass hollow bubbles may be obtained as iM30K from 3M (St. Paul, Minn.) or as solid glass particles, 2429A, 3000A or 5000A from Potters Industries, LLC (Valley Forge, Pa.)

A number of factors affect the density, size, strength, chemical durability and yield (the percentage by weight or volume of heated particles that become hollow) of hollow glass spheres. These factors include the chemical composition of the glass; the sizes of the particles fed into the furnace; the temperature and duration of heating the particles; and the chemical atmosphere (e.g., oxidizing or reducing) to which the particles are exposed during heating. The percentage of silica ($SiO_2$) in glass used to form hollow glass spheres may be between 65 and 85 percent by weight and a weight percentage of $SiO_2$ below 60 to 65 percent would drastically reduce the yield of the hollow spheres.

Useful hollow glass spheres having average densities of about 0.1 grams-cm⁻³ to approximately 0.7 grams-cm⁻³ or about 0.125 grams-cm⁻³ to approximately 0.6 grams-cm⁻³ are prepared by heating solid glass particles.

For a product of hollow glass spheres having a particular desired average density, there is an optimum sphere range of sizes of particles making up that product which produces the maximum average strength. A combination of a larger and a smaller hollow glass sphere wherein there is about 0.1 to 25 wt. % of the smaller sphere and about 99.9 to about 75 wt. % of larger particles can be used were the ratio of the particle size ($P_s$) of the larger particles to the ratio of the smaller is about 2-7:1.

Hollow glass spheres used commercially can include both solid and hollow glass spheres. All the particles heated in the furnace do not expand, and most hollow glass-sphere products are sold without separating the hollow from the solid spheres.

Useful hollow glass spheres are hollow spheres with relatively thin walls. Such spheres typically comprise a silica-lime- or an Al-silicate hollow glass and in bulk form appear to be a white powdery particulate. The density of the hollow spherical materials tends to range from about 0.1 to 0.8 g/cc and is substantially water insoluble and has an average particle size ($P_s$) that ranges from about 10 to 250 microns. In the composite material forming process, interfacially modified hollow microspheres are not substantially broken. In an embodiment, less than 10% of the hollow glass spheres are broken during the composite forming process. In another embodiment, less than 1%, 2%, 3%, 4%, or 5% of the hollow glass spheres are broken during the composite forming process.

In an embodiment the fiber may be a hard or soft wood fiber, which can be a product or product of the manufacture of lumber, other wood products or cellulose-based products in general. Wood fiber is an example of cellulosed-based or cellulosic products. The soft wood fibers are relatively long, and they contain high percentages of lignin and lower percentages of hemicellulose, as compared to hard woods. Hard or soft wood fiber particulate is chosen relative to the use of composite material of the embodiment. For example for structural use, hard wood fibers may be useful in the composite. However, useful cellulosic fiber may also be derived from other types of fibers, including flax, jute, hemp, cotton fibers, soft wood fibers, bamboo, rice, sugar cane, and recycled or reclaimed fiber from newspapers, boxes, computer printouts, or the like.

Preferably, the composite comprising the composite material uses a cellulosic fiber. The cellulosic fiber commonly comprises fibers having a high aspect ratio made of cells with cellulosic cell walls. During the composite forming process, a fraction of the cellulosic or wood fiber structure, such as for example, cell walls, lumens, vessel cells, and other physical cell morphology will not be compressed or disrupted. In one embodiment, this characteristic provides the cellulosic and glass bubble composite with both structural strength and lightness. Useful articles shaped from the composite material include dimensional lumber replacements, decorative building siding, structural building panels, roofing panels, flooring panels, foundation panels, fencing, deck railings, automobile panels, acoustic and heat insulation panels. Polymer is not introduced into the interior void volume of the cells under conditions of high temperature and pressure. In other embodiments the fiber may be hard wood fiber but soft wood fiber is also useful. The composite can be formed into any useful form such as powder pellet or member. The composite and members of the composite comprises fiber but can also contain other forms of fiber such as fabric in the form of woven or non-woven fabric. Such fabric can be added as fabric portions with a surface area of greater than 5 mm², can be coextruded as coextensive fabric within the extrusion or can be added to the composite after extrusion or other formation.

In compositions of the embodiments, the composite materials maintain both an effective composite formation of loadings of greater than 20 vol. % but also maintain substantial viscoelasticity and polymer characteristics at fiber and particulate loadings that range greater than 25 vol. %, greater than 35 vol. %, greater than 40 vol. % and can range from about 40 vol. % to as much as 95 vol. %. In these ranges of particulate loading, the composites in the application maintain the viscoelastic properties of the polymer in the polymer phase. As such within these polymer loadings, useful elongation at break wherein the elongations can be in excess of 5%, in excess of 10%, in excess of 20%, and can range from about 20 to 500% elongation at break. Further, the tensile yield point can substantially exceed the prior art materials and can range from about 5 to 10% elongation.

In compositions of the embodiments, the composite materials maintain both an effective composite formation of loadings of greater than 20 vol. % but also maintain substantial flexural properties characteristics at fiber and particulate loadings that range greater than 25 vol. %, greater than 35 vol. %, greater than 40 vol. % and may range from about 40 vol. % to as much as 80 vol. %. In these ranges of particulate loading, the composites in the application maintain flexural properties of greater than 700, 800, 900, 1000, 1200, 1400, 1600, 1800, 2000, 2500, 2700, 2900, 3200, 3300, 3500, 3700, 3900, 4100, 4300, 4500, or 4700 MPa as measured by ASTM D790 with appropriate modifications. It is difficult to predict the explicit properties due to the variable of polymer type or blend and its effect on the relative to modulus or flexural stress. In embodiments, Melt Flow Analysis (MFA) of the composite material, as measured with a Model 50 Mini-Jector from Miniature Plastics Molding (MPM) (Solon, Ohio), will exhibit improved melt flow in comparison to composite materials made with particulate that is not coated with an interfacial modifier. By way of example, the MFA for a composite material in accordance with embodiments herein will be 10%, 20%, 30%, 40%, 50%, 60%, 70%, 80%, or 90% less than otherwise identical compositions made with particulate that is not coated with the interfacial modifier. Similar beneficial properties for the composite material may be seen in extrusion pressure and flexural properties.

Typically, the composite materials herein are manufactured using melt processing and are also utilized in product formation using melt processing. In an embodiment, a thermoplastic polymer, is combined with the particulate portion and the cellulosic fiber portion, such as, for example, wood fiber, and processed until the material attains composite properties such as, for example, a uniform density (if density is the characteristic used as a determinant). Once the material attains a sufficient property, such as, for example, density, the material can be extruded into a product or into a raw material in the form of a pellet, chip, wafer, preform, or other easily processed material using conventional processing techniques. Representative physical properties of the composite material uniformly coated with an interfacial modifier are summarized below.

The range of values of the properties depends primarily on the portions of the dispersed mixed particulate within the polymer phase and can be as follows:

| Property | Polymer/Wood Fiber/Glass Bubbles Composite | Testing Protocol |
| --- | --- | --- |
| Specific Gravity | 0.87-1.17-1.47 g/cc | Puck density or Gas pycnometry as described |
| Flame Resistance | 0 | UL 94 |
| Water Vapor Uptake | 0.22-1.22-2.22% | |
| Liquid Water Uptake | 0.75-1.75-2.75% | ASTM D570 |
| Impact Strength | 8-13.0-j/cm | ASTM D5420 |
| Flexural Modulus | 2500-2900-3300 MPa | ASTM D790 |
| Flexural Strength at Yield | 18-23-28 Pa | ASTM D790 |
| Flexural Strength at Break | 35-45-55 Pa | ASTM D790 |
| Tensile Modulus | 500-700-900 MPa | ASTM D638 |
| Tensile Strength at Yield | 12-15-18 MPa | ASTM D638 |
| Tensile Strength at Break | 12-17-22 MPa | ASTM D638 |
| k-value (thermal conductivity) | 0.10-0.31 W/m-°k | Lee's Disk Apparatus |

In the manufacture of useful products with the composites of the embodiment, the manufactured shaped article made from the composite material can be obtained in appropriate amounts, subjected to heat and pressure, typically in extruder or injection molding equipment and then formed into an appropriate shape in the appropriate physical configuration.

In the appropriate product design, during composite manufacture or during product manufacture, a pigment or other dye material can be added to the processing equipment. One advantage of this material is that an inorganic dye or pigment can be co-processed resulting in a material that needs no exterior painting or coating to obtain an attractive, functional, or decorative appearance. The pigments can be included in the polymer blend, can be uniformly distributed throughout the material and can result in a surface that cannot chip, scar or lose its decorative appearance. One particularly important pigment material comprises titanium dioxide ($TiO_2$). This material is non-toxic, is a bright white particulate that can be easily combined with either non-metal, inorganic or mineral particulates and/or polymer composites to enhance the novel characteristics of the composite material and to provide a white hue to the ultimate composite material.

In another embodiment, the feedstock for additive manufacturing systems (AM) is made from the glass and wood polymer composite material and is fed through extrusion-based AM systems for building 3D models. Additive manufacturing, or 3D printing, is a manufacturing process for making a three-dimensional solid object of virtually any shape from a digital model. 3D printing is achieved using an additive process, where successive layers of material are laid down in different shapes. 3D printing is considered distinct from traditional machining techniques, which rely on the removal of material by methods such as cutting or drilling (subtractive processes). A materials printer usually performs AM system processes using digital technology. The technology is used for both prototyping and distributed manufacturing with applications in architecture, construction (AEC), industrial design, automotive, aerospace, military, engineering, civil engineering, dental and medical industries, biotech (human tissue replacement), fashion, footwear, jewelry, eyewear, education, geographic information systems, food, and many other fields.

AM system processes renders virtual blueprints from computer aided design (CAD) and "slices" them into digital cross-sections for the machine to successively use as a guideline for printing. Depending on the machine used, material or a binding material is deposited on the build bed or platform until material/binder layering is complete and the final 3D model has been "printed." It is a WYSIWYG (watch you see is what you get) process where the virtual model and the physical model are almost identical.

To perform a print, the machine reads the design from a computer file and lays down successive layers of the composite material to build the model from a series of cross sections. In the embodiments of this application, the viscoelastic composite materials comprising interfacially coated wood fiber, glass particle and optionally another particle such as ceramic, inorganic minerals, metal particles and spheres are especially useful in AM system processes. These layers, which correspond to the virtual cross sections from the CAD model, are joined or automatically fused to create the final shape. The primary advantage of this technique is its ability to create almost any shape or geometric feature in three-dimensional space, or xyz-space. AM system resolution describes layer thickness and X-Y resolution in dpi (dots per inch), or micrometers. Typical layer thickness is around 16 to 100 micrometers (μm). Construction of a model with contemporary methods can take anywhere from hours to days, depending on the method used and the size and complexity of the model. Additive manufacturing systems can typically reduce this time to a few hours, although it varies widely depending on the type of machine used and the size and number of models being produced simultaneously.

Such systems are commercially available from Stratasys, Inc. Eden Prairie Minn., as well as from other larger format additive manufactures such as Siemens or General Electric. After sintering, the object or shape can be worked, heated, polished, painted or otherwise formed into new finished shapes or structures.

The filament, wire, or feedstock, is a compositional component that feeds through the additive manufacturing (printer) system by an extruder scheme and builds a shaped article in layers deposited from the filament. For example the filament or wire is urged into the extrusion zone (hot end) by an extrusion stepper motor attached to an extrusion wheel. The extruder wheel pushes the required volume of the filament to the extrusion zone. Depending on the printer system, the filament may be circular or round in cross-section. In an embodiment, the diameter of a filament may range from 1.20 to 3.8 mm, 1.20 to 3.00 mm, 1.50 to 2.50 mm, 1.50 to 1.80 mm, or 1.50 to 1.75 mm in a circular or round cross section. The filament diameter tolerance should be within a +/−0.03 mm tolerance. Inconsistent or irregular filament diameter may lead to many problems. In one example, inconsistent filament diameters lead to variable volume and layer deposition due an improper volume of filament being heated in the extrusion zone. In other embodiments, square or pyramidal cross-sectional shapes are provided for the filaments useful for printer systems. Other cross-sectional shapes of the filament are also possible.

The filament is fed by the extrusion stepper motor into the extrusion zone. In an embodiment the feed rates may be 10 to 500 mm/sec, 10 to 400 mm/sec, 100 to 400 mm/sec, or 200 to 300 mm/sec, in the extrusion zone the filament is heated. In an embodiment the temperature of the filament may be 150° C. to 300° C., 150° C. to 280° C., 170° C. to 300° C., or 170° C. to 250° C.

In an embodiment, in weight percentages, a filament useful in additive manufacturing can have the proportions of composite materials as discussed herein. As a specific non-limiting example, such a filament may comprise:
1) 0.05 to 6.0 wt. % of interfacial modifier,
2) 10 to 70 wt. % of polymer,
3) 20 to 90 wt. % of a mixed dispersed particulate wherein the mixed particulate comprises
  i) 20 to 80 wt. % of a wood fiber particulate, and
  ii) 80 to 20 wt. % of a inorganic particle.

In an embodiment in volume percentages, as a non-limiting example, a filament useful in additive manufacturing may comprise:
1) 0.05 to 6.0 vol. % of interfacial modifier,
2) 10 to 70 vol. % of polymer,
3) 20 to 90 volume % of a mixed dispersed particulate wherein the mixed particulate comprises:
  i) 20 to 80 vol. % of a wood fiber particulate, and
  ii) 80 to 20 vol. % of a inorganic particle.

We have further found that a blend of two, three or more non-metal, inorganic or minerals in particulate form in addition to wood fiber or alternative fiber material, such as glass, boron, carbon, aramid, metal, cellulosic, polyester, nylon can obtain important composite properties from all of the components in a polymer composite structure. Such composites each can have unique or special properties. These composite processes and materials have the unique capacity and property such that the composite material acts as a blended composite that could not, due to melting point and other processing difficulties, be made into a blend of properties without the methods of the making the composite material.

Polymers

A large variety of polymer materials can be used in the composite materials. For the purpose of this application, a polymer is a general term covering either a thermoset or a thermoplastic. We have found that useful polymer materials include both condensation polymeric materials and addition or vinyl polymeric materials. Included are both vinyl and condensation polymers, and polymeric alloys thereof. The polymer has a density of at least 0.85 g-cm−3, however, polymers having a density of greater than 0.96 are useful to enhance overall product density. A density is often up to 1.7 or up to 2 g-cm−3 or up to 1.90 g-cm−3 or 0.9 to 1.90 g-cm−3 or can be about 1.5 to 1.95 g-cm−3. The polymer phase may be present in the composite material in about 10.0 to 70.0 wt. %, in about 10.0 to 60.0 wt. % or in about 10.0 to 50.0% wt. %. The polymer phase in the composite material may be a continuous polymer phase as it is known in the polymer technology art.

Vinyl polymers include polyethylene, polypropylene, polybutylene, acrylonitrile-butadiene-styrene (ABS), polybutylene copolymers, polyacetyl resins, polyacrylic resins, homopolymers or copolymers comprising vinyl chloride, vinylidene chloride, fluorocarbon copolymers, etc. Condensation polymers include nylon, phenoxy resins, polyarylether such as polyphenylether, polyphenylsulfide materials; polycarbonate materials, chlorinated polyether resins, polyethersulfone resins, polyphenylene oxide resins, polysulfone resins, polyimide resins, thermoplastic urethane elastomers and many other resin materials.

Condensation polymers that can be include polyamides, polyamide-imide polymers, polyarylsulfones, polycarbonate, poly (lactic acid) or polylactide (PLA) polybutylene terephthalate, polybutylenenaphthalate, polyetherimides, polyethersulfones, polyethylene terephthalate, thermoplastic polyamides, polyphenylene ether blends, polyphenylene sulfide, polysulfones, thermoplastic polyurethanes and others. Useful condensation engineering polymers include polycarbonate materials, polyphenyleneoxide materials, and polyester materials including polyethylene terephthalate, polybutylene terephthalate, polyethylene naphthalate and polybutylenenaphthalate materials.

Polycarbonate engineering polymers are high performance, amorphous engineering thermoplastics having high impact strength, clarity, heat resistance and dimensional stability. Polycarbonates are generally classified as a polyester or carbonic acid with organic hydroxy compounds. The common polycarbonates are based on phenol A as a hydroxyl compound copolymerized with carbonic acid. Polycarbonates can often be used as a versatile blending material as a component with other commercial polymers in the manufacture of alloys. Polycarbonates can be combined with polyethylene terephthalate acrylonitrile-butadiene-styrene, styrene maleic anhydride and others. Useful alloys comprise a styrene copolymer and a polycarbonate. Useful polycarbonate materials should have a melt index between 0.5 and 7, preferably between 1 and 5 g–10 $\min^{-1}$.

A variety of polyester condensation polymer materials including polyethylene terephthalate, polybutylene terephthalate, polyethylene naphthalate, polybutylenenaphthalate, etc. can be useful. Polyethylene terephthalate and polybutylene terephthalate are high performance condensation polymer materials. Polyethylene naphthalate and polybutylenenaphthalate materials can be made by copolymerizing as above using as an acid source, a naphthalene dicarboxylic acid. The naphthalate thermoplastics have a higher Tg and higher stability at high temperature compared to the terephthalate materials. However, these polyester materials are useful in the composite materials. Such materials have a useful molecular weight characterized by melt flow properties. Useful polyester materials have a viscosity at 265° C. of about 500-2000 cP, preferably about 800-1300 cP.

Polyphenylene oxide materials are engineering thermoplastics that are useful at temperature ranges as high as 330° C. Polyphenylene oxide has excellent mechanical properties, dimensional stability, and dielectric characteristics. Commonly, phenylene oxides are manufactured and sold as polymer alloys or blends when combined with other polymers or fiber. Polyphenylene oxide typically comprises a homopolymer of 2,6-dimethyl-1-phenol. The polymer commonly known as poly (oxy-(2,6-dimethyl-1,4-phenylene)). Polyphenylene is often used as an alloy or blend with a polyamide, typically nylon 6-6, alloys with polystyrene or high impact styrene and others. A melt index (ASTM 1238) for the polyphenylene oxide material can range from about 1 to 20, preferably about 5 to 10 g/10 min. The melt viscosity is about 1000 cP at 265° C.

Another class of thermoplastic includes styrenic copolymers. The term styrenic copolymer indicates that styrene is copolymerized with a second vinyl monomer resulting in a vinyl polymer. Such materials contain at least a 5 mol-% styrene and the balance being 1 or more other vinyl monomers. An important class of these materials is styrene acrylonitrile (SAN) polymers. SAN polymers are random amorphous linear copolymers produced by copolymerizing styrene acrylonitrile and optionally other monomers. Emulsion, suspension and continuous mass polymerization techniques have been used. SAN copolymers possess transparency, excellent thermal properties, good chemical resistance and hardness. These polymers are also characterized by their rigidity, dimensional stability and load bearing capability. Olefin modified SAN's (OSA polymer materials) and acrylic styrene acrylonitriles (ASA polymer materials) are known. These materials are somewhat softer than unmodified SAN's and are ductile, opaque, two phased terpolymers that have surprisingly improved weather-ability.

ASA polymers are random amorphous terpolymers produced either by mass copolymerization or by graft copolymerization. These materials can also be blended or alloyed with a variety of other polymers including polyvinyl chloride, polycarbonate, polymethyl methacrylate and others. An important class of styrene copolymers includes the acrylonitrile-butadiene-styrene monomers (AB S). These polymers are very versatile family of engineering thermoplastics produced by copolymerizing the three monomers. Each monomer provides an important property to the final terpolymer material. The final material has excellent heat resistance, chemical resistance and surface hardness combined with processability, rigidity and strength. The polymers are also tough and impact resistant. The styrene copolymer family of polymers have a melt index that ranges from about 0.5 to 25, preferably about 0.5 to 20.

An important class of engineering polymers that can be used in the composite material include acrylic polymers. Acrylics comprise a broad array of polymers and copolymers in which the major monomeric constituents are an ester acrylate or methacrylate. These polymers are often provided in the form of hard, clear sheet or pellets. Useful acrylic polymer materials have a melt index of about 0.5 to 50, preferably about 1 to 30 g/10 min.

Vinyl polymer polymers include a acrylonitrile; polymer of alpha-olefins such as ethylene, propylene, etc.; chlorinated monomers such as vinyl chloride, vinylidene dichloride, acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

Thermoplastics include polyvinylchloride, polyphenylene sulfite, acrylic homopolymers, maleic anhydride containing polymers, acrylic materials, vinyl acetate polymers, diene containing copolymers such as 1,3-butadiene, 1,4-pentadiene, halogen or chlorosulfonyl modified polymers or other polymers and are useful within the composite material of the invention. Condensation polymeric thermoplastics can be used including polyamides, polyesters, polycarbonates, polysulfones and similar polymer materials by reacting end groups with silanes having aminoalkyl, chloroalkyl, isocyanato or similar functional groups.

Polyvinyl chloride is a common commodity thermoplastic polymer. Vinyl chloride monomer is made from a variety of different processes such as the reaction of acetylene and hydrogen chloride and the direct chlorination of ethylene. Polyvinyl chloride is typically manufactured by the free radical polymerization of vinyl chloride resulting in a useful thermoplastic polymer. After polymerization, polyvinyl chloride is commonly combined with thermal stabilizers, lubricants, plasticizers, organic and inorganic pigments, fillers, biocides, processing aids, flame retardants, and other commonly available additive materials. A useful polyvinyl chloride in an embodiment is 87180 from PolyOne (Avon Lake, Ohio)

Polyvinyl chloride can also be combined with other vinyl monomers in the manufacture of polyvinyl chloride copolymers. Such copolymers can be linear copolymers, branched copolymers, graft copolymers, random copolymers, regular repeating copolymers, block copolymers, etc. Monomers that can be combined with vinyl chloride to form vinyl chloride copolymers include an acrylonitrile; alphaolefins such as ethylene, propylene, etc.; chlorinated monomers such as vinylidene dichloride; acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions. Such monomers can be used in an amount of up to about 50 mol-%, the balance being vinyl chloride. In an embodiment the composite comprises or about 20.0 wt. % to 50.0 wt. % or about 20.0 Wt. % to 60.0 wt. % or about 20.0 wt. % to 70.0 wt. % or about 20.0 Wt. % to 80.0 wt. % or about 20.0 wt. % to 90.0 wt. % polyvinyl chloride, Polymer blends or polymer alloys can be useful in manufacturing the pellet or linear extrudate of the composite material. Such alloys typically comprise two miscible polymers blended to form a uniform composition. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition dependent glass transition temperature (Tg). Immiscible or non-alloyed blend of polymers typically displays two or more glass transition temperatures associated with immiscible polymer phases. In the simplest cases, the properties of polymer alloys reflect a composition weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented.

The primary requirement for the substantially thermoplastic engineering polymer material is that it retains sufficient thermoplastic properties such as viscosity and stability, to permit melt blending with a particulate, permit formation of linear extrudate pellets, and to permit the composition material or pellet to be extruded or injection molded in a thermoplastic process forming the useful product. Engineering polymer and polymer alloys are available from a number of manufacturers including Dyneon LLC, B.F. Goodrich, G.E., Dow, and duPont.

Phenolic polymers can also be used in the manufacture of the structural members of the composite material. Phenolic polymers typically comprise a phenol-formaldehyde polymer. Such polymers are inherently fire resistant, heat resistant and are low in cost.

The fluorocarbon polymers useful in the composite material are perflourinated and partially fluorinated polymers made with monomers containing one or more atoms of fluorine, or copolymers of two or more of such monomers. Common examples of fluorinated monomers useful in these polymers or copolymers include tetrafluoroethylene (TFE), hexafluoropropylene(HFP), vinylidene fluoride (VDF), perfluoroalkylvinyl ethers such as perfluoro-(n-propyl-vinyl) ether (PPVE) or perfluoromethylvinylether (PMVE). Other copolymerizableolefinic monomers, including non-fluorinated monomers, may also be present.

Particularly useful materials for the fluorocarbon polymers are TFE-HFP-VDF terpolymers (melting temperature of about 100 to 260° C.; melt flow index at 265° C. under a 5 kg load is about 1-30 g–10 min$^{-1}$), hexafluoropropylene-tetrafluoroethylene-ethylene (HTE) terpolymers (melting temperature about 150 to 280° C.; melt flow index at 297° C. under a 5 kg load of about 1-30 g–10 min$^{-1}$), ethylenetetrafluoroethylene (ETFE) copolymers (melting temperature about 250 to 275° C.; melt flow index at 297° C. under a 5 kg load of about 1-30 g–10 min$^{-1}$), hexafluoropropylene-tetrafluoroethylene (FEP) copolymers (melting temperature about 250 to 275° C.; melt flow index at 372° C. under a 5 kg load of about 1-30 g–10 min$^{-1}$), and tetrafluoroethylene-perfluoro(alkoxy alkane) (PFA) copolymers (melting temperature about 300 to 320° C.; melt flow index at 372° C. under a 5 kg load of about 1-30 g–10 min$^{-1}$). Each of these fluoropolymers is commercially available from Dyneon LLC, Oakdale, Minn. The TFE-HFP-VDF terpolymers are sold under the designation "THV".

Also useful are vinylidene fluoride polymers primarily made up of monomers of vinylidene fluoride, including both homo polymers and copolymers. Such copolymers include those containing at least 50 mole percent of vinylidene fluoride copolymerized with at least one comonomer selected from the group of tetrafluoroethylene, trifluoroethylene, chlorotrifluoroethylene, hexafluoropropene, vinyl fluoride, pentafluoropropene, and any other monomer that readily copolymerizes with vinylidene fluoride. These materials are further described in U.S. Pat. No. 4,569,978 (Barber) incorporated herein by reference. Such materials are commercially available under the KYNAR trademark from Arkema Group located in King of Prussia, Pa. or under the DYNEON trademark from Dyneon LLC of Oakdale, Minn.

Fluorocarbon elastomer materials can also be used in the composite materials. Fluorocarbon elastomers contain VF2 and HFP monomers and optionally TFE and have a density greater than 1.8 g-cm$^3$. These polymers exhibit good resistance to most oils, chemicals, solvents, and halogenated hydrocarbons, and excellent resistance to ozone, oxygen, and weathering. Their useful application temperature range is –40° C. to 300° C. Fluorocarbon elastomer examples include those described in detail in Lentz, U.S. Pat. No. 4,257,699, as well as those described in Eddy et al., U.S. Pat. No. 5,017,432 and Ferguson et al., U.S. Pat. No. 5,061,965. The disclosures of each of these patents are totally incorporated herein by reference.

Latex fluorocarbon polymers are available in the form of the polymers comprising the PFA, FEP, ETFE, HTE, THV and PVDF monomers. Fluorinated poly(meth)acrylates can generally be prepared by free radical polymerization either neat or in solvent, using radical initiators well known to those skilled in the art. Other monomers which can be copolymerized with these fluorinated (meth)acrylate monomers include alkyl (meth)acrylates, substituted alkyl (meth)acrylates, (meth)acrylic acid, (meth)acrylamides, styrenes, vinyl halides, and vinyl esters. The fluorocarbon polymers can comprise polar constituents. Such polar groups or polar group containing monomers may be anionic, nonionic, cationic, or amphoteric. The latex fluorocarbon polymers described herein are typically aqueous dispersed solids but solvent materials can be used. The fluorocarbon polymer can combined with various solvents to form emulsion, solution or dispersion in a liquid form. Dispersions of fluoropolymers can be prepared using conventional emulsion polymerization techniques, such as described in U.S. Pat. Nos. 4,418,186; 5,214,106; 5,639,838; 5,696,216 or *Modern Fluoropolymers*, Edited by John Scheirs, 1997 (particularly pp. 71-101 and 597-614) as well as assignees' copending patent application Ser. No. 01/03,195, filed Jan. 31, 2001.

The liquid forms can be further diluted in order to deliver the desired concentration. Although aqueous emulsions, solutions, and dispersions are useful, up to about 50% of a cosolvent such as methanol, isopropanol, or methyl perfluorobutyl ether may be added. Preferably, the aqueous emulsions, solutions, and dispersions comprise less than about 30% cosolvent, more preferably less than about 10% cosolvent, and preferably the aqueous emulsions, solutions, and dispersions are substantially free of cosolvent.

Interfacial Modifier

Interfacial modifiers provide the close association of the particle with the polymer. Interfacial modifiers used in the non-reactive or non-crosslinking application to provide non-reactive surfaces on particulate fall into broad categories including, for example, stearic acid derivatives, titanate compounds, zirconate compounds, phosphonate compounds, aluminate compounds.

Aluminates, phosphonates, titanates and zirconates useful contain from about 1 to about 3 ligands comprising hydrocarbyl phosphate esters and/or hydrocarbylsulfonate esters and about 1 to 3 hydrocarbyl ligands which may further contain unsaturation and heteroatoms such as oxygen, nitrogen and sulfur. Preferably the titanates and zirconates contain from about 2 to about 3 ligands comprising hydrocarbyl phosphate esters and/or hydrocarbyl sulfonate esters, preferably 3 of such ligands and about 1 to 2 hydrocarbyl ligands, preferably 1 hydrocarbyl ligand.

The choice of interfacial modifiers is dictated by fiber, particulate, polymer, and application. The wood fiber and particle are coated even if having substantial morphology. For example, the maximum density of a composite is a function of the densities of the components and the volume fractions of each. Higher density composites are achieved by maximizing the per unit volume of the components with the highest densities. When forming composites with polymeric volumes approximately equal to the excluded volume of the fiber and particulates, inter-particle-fiber interaction dominates the behavior of the material. Particles and fibers contact one another via opposing surfaces and the combination of interacting sharp edges, soft surfaces and the friction between the surfaces prevent further or optimal packing. Therefore, maximizing properties of the particles is a function of softness of surface, hardness of edges, point size of point (sharpness), surface friction force and pressure on the material, circularity, aspect ratio and the usual, shape size distribution. Because of this inter-particle-fiber friction, the forming pressure will decrease exponentially with distance from the applied force.

Interfacially modifying chemistries are capable of modifying the surfaces of the fibers and particles by coordination bonding, van der Waals forces, covalent bonding, or a combination of all three. The surface of the particle and fiber behaves as a particle or fiber of the interfacial modifier. These organic materials of the interfacial modifiers reduce the friction between particles and fibers preventing gouging and allowing for greater freedom of movement between particles and fibers. These phenomena allow the applied shaping force to reach deeper into the form resulting in a more uniform, and in many instances a lower, pressure gradient present during extrusion or injection molding.

Useful titanates and zirconates include isopropyl tri(dioctyl)pyrophosphato titanate (available from Kenrich Chemicals under the designation KR38S), neopentyl(diallyl)oxy, tri(dodecyl)benzene-sulfonyl titanate (available from Kenrich Chemicals under the trademark and designation LICA 09), neopentyl(diallyl)oxy, trioctyl phosphato titanate (available from Kenrich Chemicals under the trademark and designation LICA 12), neopentyl(diallyl)oxy, tri(dodecyl) benzene-sulfonyl zirconate (available from Kenrich Chemicals under the designation NZ 09), neopentyl(diallyl)oxy, tri(dioctyl)phosphato zirconate (available from Kenrich Chemicals under the designation NZ 12), and neopentyl (diallyl)oxy, tri(dioctyl)pyro-phosphato zirconate (available from Kenrich Chemicals under the designation NZ 38). A useful titanate is tri(dodecyl)benzene-sulfonyl titanate (available from Kenrich Chemicals under the designation LICA 09). The interfacial modifiers modify the particulate in the composite material with the formation of a layer on the surface of the particle reducing the intermolecular forces, improving the tendency of the polymer to mix with the particle, improving mixing and packing of particles and resulting in composite viscoelastic properties. In one embodiment density is minimized for the composite material. Other composite properties may be tuned as disclosed in the aforementioned table.

Thermosetting polymers can be used in an uncured form to make the composites with the interfacial modifiers. Once the composite is formed the reactive materials can chemically bond the polymer phase if a thermoset polymer is selected. The reactive groups in the thermoset can include methacrylyl, styryl, or other unsaturated or organic materials.

Manufacture of Pellet

The manufacture of the particulate and fiber composite materials depends on good manufacturing technique. Often the particulate and fiber is initially treated to ensure uniform particulate coating.

The interfacial modifier can also be added to particles and fibers with a coating application in bulk blending operations using high intensity blenders, such as, for example, Littleford or Henschel blenders. Alternatively, twin cone mixers can be followed by drying or direct addition to a screw compounding device. Interfacial modifiers may also be reacted with the particulate and fiber in a solvent such as, isopropyl alcohol, toluene, tetrahydrofuran, mineral spirits or other such known solvents.

The particulate and fiber can be interfacially combined into the polymer phase depending on the nature of the polymer phase, the fiber, the particulate surface chemistry and any pigment process aid or additive present in the composite material. In general, the mechanism used to associate the particulate and fiber to the polymer include solvation, chelation, coordination bonding (ligand formation), etc. Typically, however, covalent bonds, linking or coupling the fiber, the particle, interfacial modifier, and the polymer are not formed. Titanate, phosphonate or zirconate agents can be used. Such agents have the following formula:

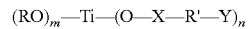

$(RO)_m-Ti-(O-X-R'-Y)_n$

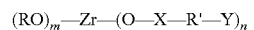

$(RO)_m-Zr-(O-X-R'-Y)_n$

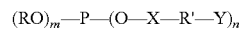

$(RO)_m-P-(O-X-R'-Y)_n$ wherein R and R' are independently a hydrocarbyl, C1-C12 alkyl group or a C7-20 alkyl or alkaryl group wherein the alkyl or alkaryl groups may optionally contain one or more oxygen atoms or unsaturation; X is sulfate or phosphate; Y is H or any common substituent for alkyl or aryl groups; m and n are 1 to 3. Titanates provide antioxidant properties and can modify or control cure chemistry. Zirconate provides excellent bond strength but maximizes curing, reduces formation of off color in formulated thermoplastic materials. A useful zirconate material is neopentyl(diallyl)oxy-tri(dioctyl)phosphato-zirconate.

The composite materials having the desired physical properties can be manufactured as follows. In an embodiment, the surface of the particulate and fiber is initially prepared, the interfacial modifier is coated, and the resulting product is isolated and then combined with the continuous polymer phase to affect an interfacial association between the particulate, fiber and the polymer. Once the composite material is prepared, it is then formed into the desired shape of the end use material. Solution processing is an alternative that provides solvent recovery during materials processing.

The materials can also be dry-blended without solvent. Blending systems such as ribbon blenders obtained from Drais Systems, high density drive blenders available from Littleford Brothers and Henschel are possible. Further melt blending using Banberry, veferralle single screw or twin screw compounders is also useful. When the materials are processed as a plastisol or organosol with solvent, liquid ingredients are generally charged to a processing unit first, followed by polymer, particulate and fiber and rapid agitation. Once all the materials are added a vacuum can be applied to remove residual air and solvent, and mixing is continued until the composite material of the product is uniform.

Dry blending is generally preferred due to advantages in cost. However certain embodiments can be compositionally unstable due to differences in wood fiber and particle size. In dry blending processes, the composite can be made by first introducing the polymer, combining the polymer stabilizers, if necessary, at a temperature from about ambient to about 60° C. with the polymer, blending a particulate and fiber with the stabilized polymer, blending other process aids, interfacial modifier, colorants, indicators or lubricants followed by mixing in hot mix, transfer to storage, packaging or end use manufacture.

Interfacially modified fiber and particulate materials can be made with solvent techniques that use an effective amount of solvent to initiate formation of a composite. Care should be taken to maximize lumen retention of the wood fiber. During the steps of particle preparation, compounding and extrusion, it is easy to damage the fibers. When interfacial treatment is substantially complete, the solvent can be stripped. Such solvent processes are conducted as follows:
1) Solvating the interfacial modifier or polymer or both;
2) Mixing the particulate and fiber into a bulk phase or polymer master batch: and
3) Devolatilizing the composition in the presence of heat & vacuum above the Tg of the polymer.

When compounding with twin screw compounders or extruders, a useful process can be used involving twin screw compounding as follows.
1. Add particulate and fiber and raise temperature to remove surface water.
2. Add interfacial modifier and fiber to twin screw when at temperature.
3. Disperse/distribute surface chemical treatment on fiber and particulate.
4. Maintain temperature to completion.
5. Vent by-products.
6. Add polymer binder.
7. Compress/melt polymer binder.
8. Disperse/distribute polymer binder in particulate and fiber.
9. Combine modified particulate and fiber with polymer binder.
10. Vacuum degas remaining products.
11. Compress resulting composite.
12. Form desired shape, pellet, lineal, tube, injection mold article, etc. through a die or post-manufacturing step.

Alternatively in formulations containing small volumes of continuous phase:
1. Add polymer binder.
2. Add interfacial modifier to twin screw when polymer binder is at temperature.
3. Disperse/distribute interfacial modifier in polymer binder.
4. Add filler and disperse/distribute particulate and fiber.
5. Raise temperature
6. Maintain temperature to completion.
7. Compress resulting composite.
8. Form desired shape, pellet, lineal, tube, injection mold article, etc. through a die or post-manufacturing step.

In an embodiment of the pellet compositions the particulate comprising wood fiber and hollow microsphere particulate comprise at least about 40 vol. %, at least about 45 vol. %, or at least about 50 vol. %. The pellet can have a variety of cross-sectional shapes including triangular, square, rectangular, oval, etc.

A useful pellet is a cylinder, the preferred radius of the cylinder is at least 1.5 mm with a length of at least 1 mm. Preferably, the pellet has a radius of 1 to 5 mm and a length of 1 to 10 mm. In an embodiment, the cylinder has a radius of 2.3 to 2.6 mm, a length of 2.4 to 4.7 mm, and a bulk density of about 0.2 to about 0.8 $g\text{-}m^{-3}$.

After the pellets are formed, the panels or other objects are preferably profile extruded in the specific cross-sectional shape desired. However, it is also possible for the panels to be molded, vacuum formed, bent or roll-formed from sheet material. The panels can be fabricated in pre-specified lengths for the particular job application desired, or can be formed in standard lengths and cut to size at the building site.

Control of moisture in the polymer, particle, and fiber composite is important to obtaining consistent, high-quality composite material and dimensional stability. Removal of a substantial proportion of the water in the fiber is required in order to obtain an optimal pellet for processing. Preferably, water is controlled to a level of less than about 12 wt.-%, of less than about 10 wt.-%, of less than about 8 wt.-%, of less than about 5 wt.-% in the pellet, based on the pellet weight, if processing conditions provide that vented extrusion equipment can dry the material prior to the final formation of any shaped article.

In an embodiment, the composite material may be used for making a structural composite useful for making panels for siding, flooring, roofing, decking, railings panels for building huts or temporary buildings, structural members or unit module, The composite material to make the structural material comprises polyvinyl chloride, interfacially modified particulate and interfacially modified wood fiber, wherein the specific gravity of the pellet used to make the structural material is about 1.17 gram per cubic cm. for reasons of improved thermal properties, structural properties, modulus, compression strength, etc.

The coefficient of thermal expansion of the polymer-fiber-particulate composite material is a reasonable compromise between the longitudinal coefficient of thermal expansion of PVC, which is typically about $4\times10^{-5}$ in./in./degree F., and the thermal expansion of wood in the transverse direction, which is approximately $0.2\times10^{-5}$ in./in./degree F. Depending upon the proportions of the composite materials and the degree to which the components of polymer, interfacially modified particulate and interfacially modified fiber are blended and uniform, the coefficient of thermal expansion of the material can range from about 1.5 to $3.0\times10^{-5}$ preferably about 1.6 to $1.8\times10^{5}$ in./in./degree F.

The composite material displays a Young's modulus of at least 700 MPa, or in the range between 5,500 and 14,000 MPa.

FIGURES

Figure 1B:
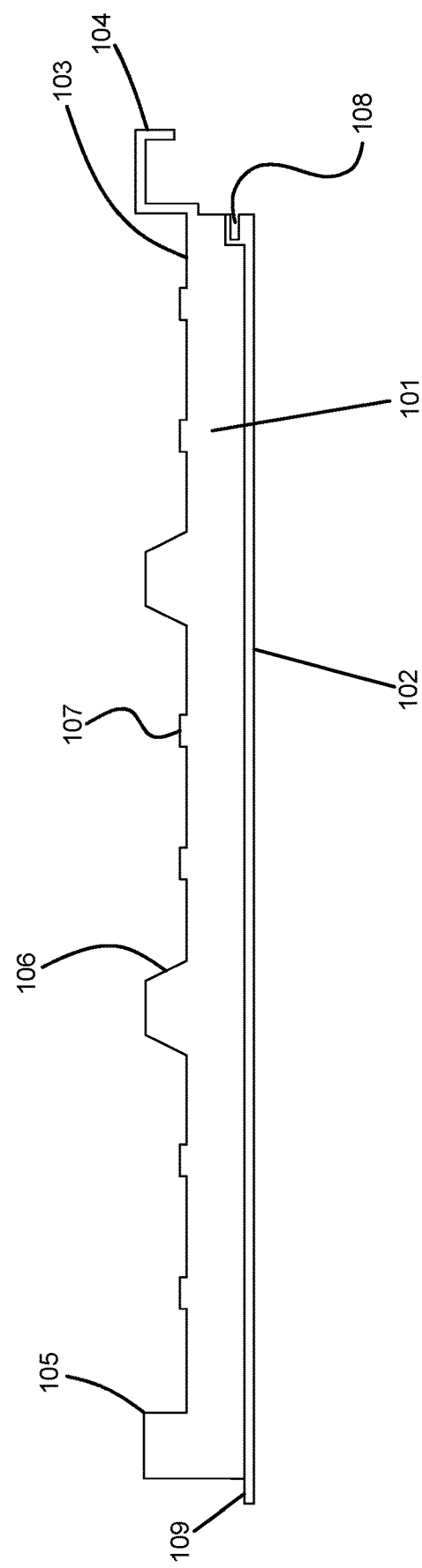

FIGS. 1A and 1B show an isometric and side view of a building panel 100. The composite material 101 is disposed between cap-stock layers 102 and 103. The building panel is formed with joinery means 104 and 105 that cooperate to fix the panels in place. The building panel is also formed with reinforcing elements 106 and 107. These reinforcing elements (larger element 106 smaller 107) also provide decorative detail to the panel. The building a tongue 109 in groove 108 joinery means to align the panels in a wall or other structure.

In an embodiment, the composite material has a coating disposed thereon. For example, the composite material may be coextruded with a weather resistant capstock (FIG. 1B, 102) which is resistant to ultra-violet light degradation. One example of such a material is a polyvinylidene difluoride composition. The capstock features a desirable surface finish, has the desired hardness and scratch resistance, and has an ability to be colored by the use of readily available colorants. Preferably, the gauge thickness for the cap coat is approximately 0.001 to 0.100 inches across the siding surface, is preferably approximately 0.02 inch. The capstock 35 is coextensive with at least the exposed surfaces of the siding unit substrate and is tightly bonded thereto.

One suitable type of capstock is a DURACAP® polymer, manufactured by The Geon Company, which is described in U.S. Pat. Nos. 4,183,777 and 4,100,325. In addition, an AES-type polymer can be used (such as ROVEL® brand weatherable polymers manufactured by The Dow Chemical Company), or an ASA-type polymer can be used (such as GELOY® and CENTREX® polymers manufactured by the General Electric Company and Monsanto, respectively). The capstock can be either coextruded with the substrate or laminated onto the substrate. In the preferred embodiment, the capstock is coextruded. The coextrusion of the capstock polymer is accomplished with dual-extrusion techniques, so that the capstock and substrate are formed as a single integral unit. Because the capstock may contain colorants and pigments, no additional topcoating is necessary or required in the resulting structures. However, a coating of paint or other material may be applied if desired.

Besides a capstock, the outer layer 102 or 103 could be a veneer, a wood grain covering, a pigmented covering, or another type of coextruded layer. In an embodiment, the outer surface 103 of the structural member or panel 100 is smooth. However, the siding could feature decorative indentations on the outer surface, for example, to resemble the appearance of wood. The texture can be produced by use of an embossing wheel, through which the siding passes after the extrusion process.

Figure 2B:
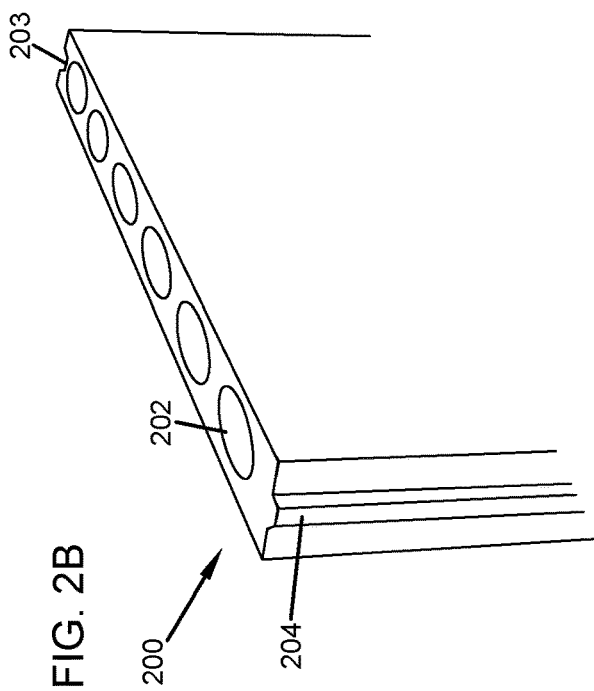
FIGS. 2A-2C show a second embodiment of a building panel of the invention using the composite material with tongue and groove joinery.
Figure 2A:
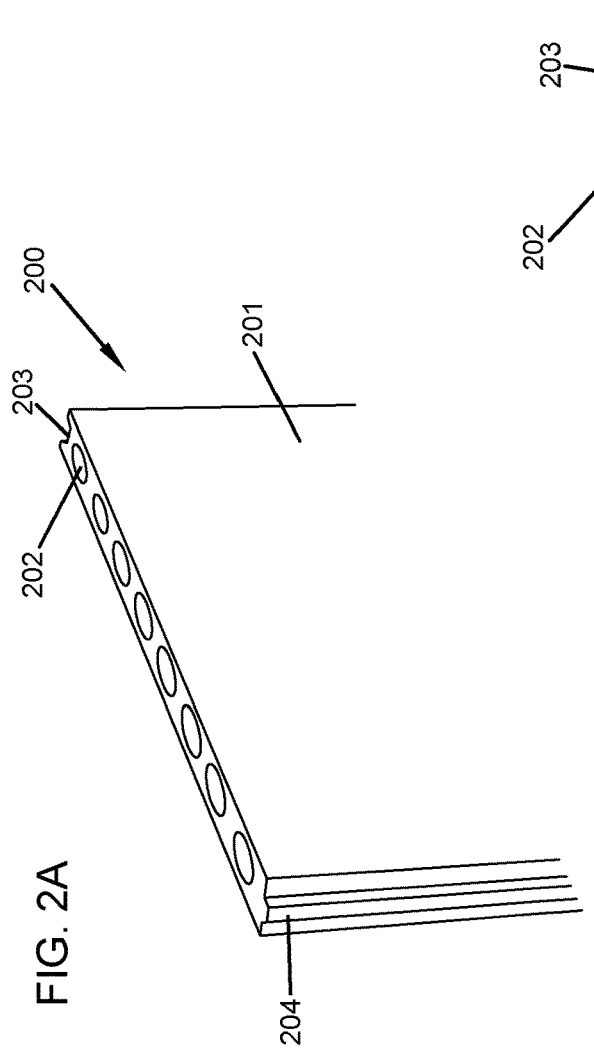
Figure 2C:
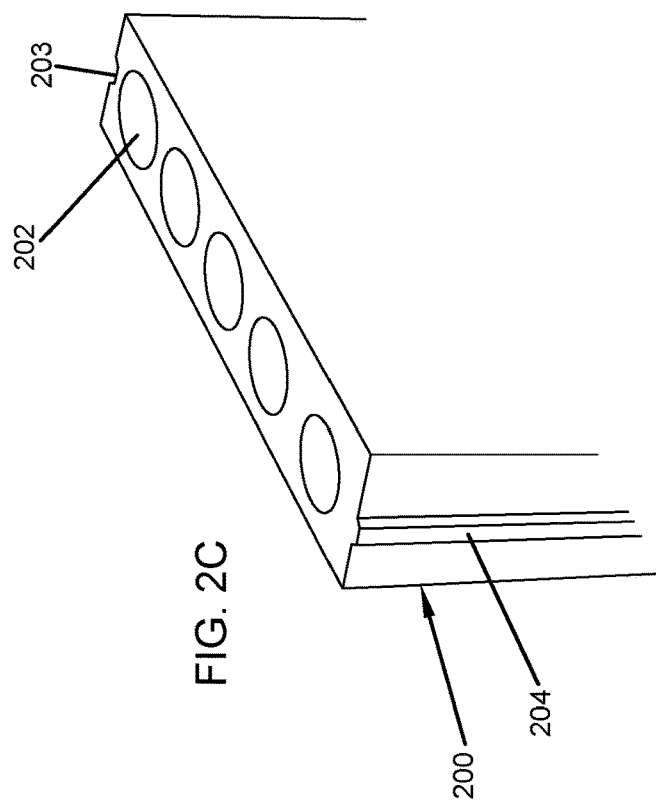

FIGS. 2A-2C show building panel structures 200, including composite material 201 and joinery, in the form of tongue and groove elements 203 and 204. The building panel includes void spaces 202 that extend along the length of the panel and provide insulation value and weight reduction.

FIGS. 3A and 3B illustrate third and fourth embodiments 350, 351 of the siding made from the composite material. Each siding unit 350, 351 has three portions: a central structural member that can be used horizontally or vertically, main portion 352 having an exposed front face 360; an upper flange 355, 356; and a lower portion 356 having a notch 354.

The difference between the embodiments of FIGS. 3A and 3B is the construction of the upper flange 355, 356. The upper flange 355 in FIG. 3A is made of solid construction, whereas the upper flange 356 in FIGS. 3A and 3B has a thinner wall and reinforcing ribs 357. As is shown in FIGS. 3A and 3B, the main body portion 352 is hollow, which has a web structure with three apertures 358.

The type of members 350,351 illustrated in FIGS. 3A and 3B may be applied either horizontally or vertically. With this design, the nails 359 are not hidden from view. Rather, each nail 359 passes through the lower web aperture of the main body portion 352 of the siding 350, 351. Preferably, the notch 354 provides for an overlap of approximately one half inch between the adjacent siding units. The lower edge 361 of one course's front face 360 is spaced above the upper edge 362 of the next lower course, forming a groove 363 between adjacent courses of siding. This groove 363 can have various dimensions but in some embodiments is approximately one inch wide.

FIG. 3B illustrates a fourth embodiment 465 of the siding. This type of siding 465 may also be applied either horizontally or vertically. The siding 465 has three portions, a central body portion 466, an upper notch portion 467, and a lower notch portion 468. The central body portion 466 preferably has a web structure with a plurality (e.g.) a total of five apertures, with (e.g.) three of the apeltures 469 being relatively large and two of the apertures 470 being relatively small. Each of the apeltures 470 accommodates a nail 471. In the embodiment illustrated, two nails 471 are applied in each course of siding 465. The upper and lower notches 467, 468 are sized and configured such that the adjoining courses of siding 465 overlap. Preferably, each lower notch has a mitered portion 472, which abuts against a mitered portion 473 in the upper web of the main body portion. These mitered portions 472,473 form a V-shaped groove 474. The composite material has equal applicability to siding systems in which the panels are installed or positioned vertically. As described above, the embodiments of FIGS. 3A and 3B may be installed in a vertical manner. In addition, vertical siding units made of the inventive composite material may be of a shiplap or a tongue-and-groove type, or plain boards of the composite material may be applied in one of several ways, such as board and batten; board and board; and batten and board in structural or non-structural applications.

Figure 5:
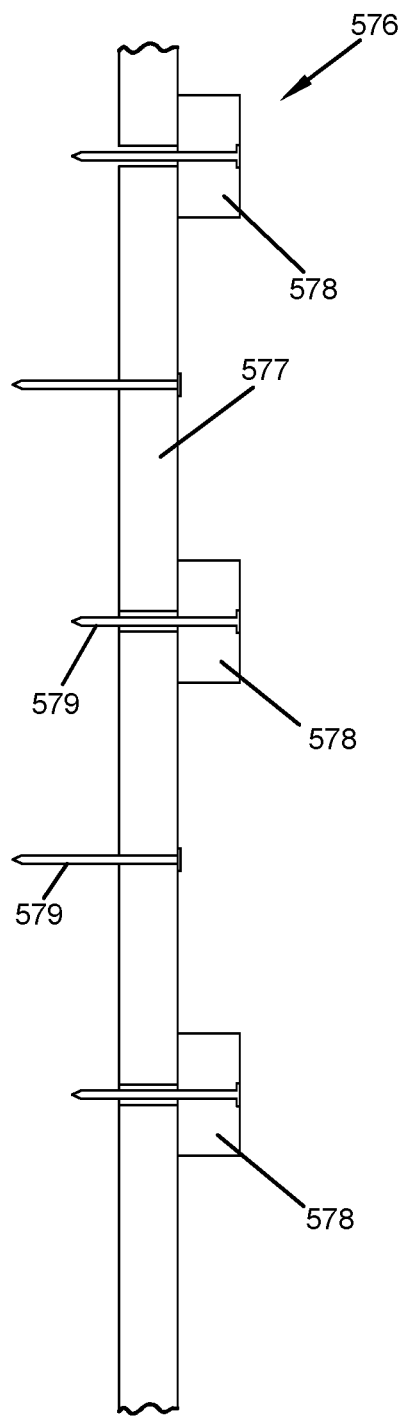
FIG. 5 shows a cross-sectional view of a further embodiment of a siding member.

FIG. 5 illustrates a fifth embodiment, in which solid structural members in a board and batten construction is employed. The siding 576 has a plurality of vertically extending boards 577, and a plurality of vertically extending battens 578. The composite material is used for both the board 577 and batten 578 components of the siding 576. Nails 579 pass through both the boards 577 and the battens 578. In the embodiment shown, both the board and batten are made of a solid length of composite material. However, the board and/or batten could be made of a hollow, webbed construction as illustrated with the other embodiments. In addition, the solid siding members could be made of a foamed composite material.

Figure 6:
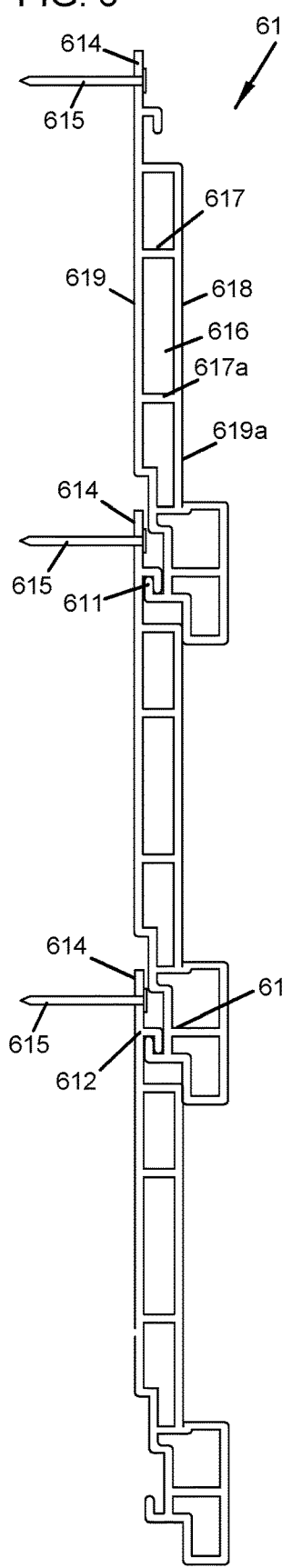
FIGS. 6-8 show further embodiments of siding members with alternative profiles.
Figure 7:
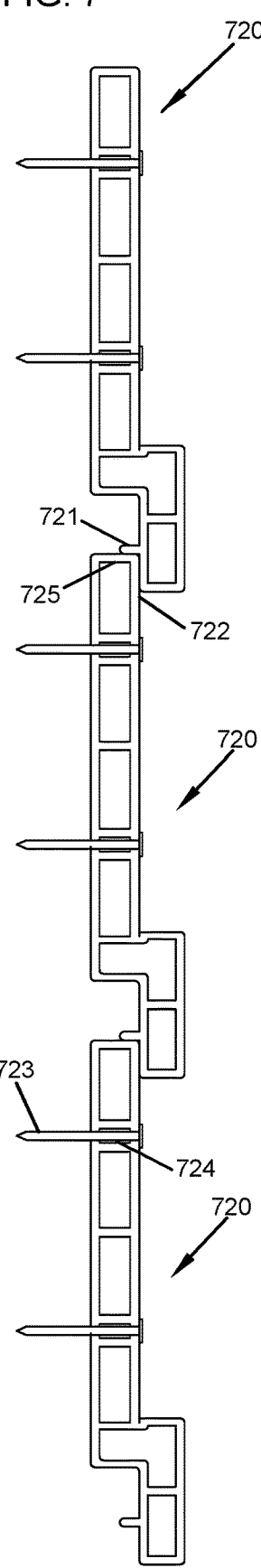
Figure 8:
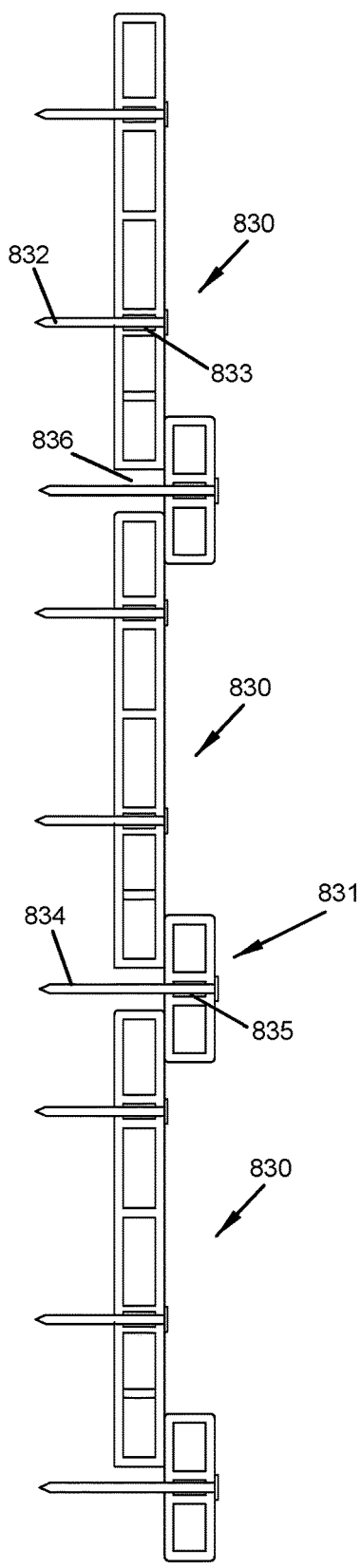

FIGS. 6-8 illustrate alternative siding profiles 610, 720, i.e., the seventh, eighth and ninth embodiments of the siding unit. These designs have a non-curved, more rectilinear but pleasing appearance. The profiles 610, 720 each have a unique interlock mechanism for connecting adjoining siding units. The embodiments of FIGS. 6-8 are suitable for vertical siding installations.

In FIG. 6 a tongue 611 engages notch 612 defined by hook portion 613. In this matter, adjacent courses of siding 610 are interconnected and held in place. Preferably, the flange 614 adjacent to hook 613 has a series of slots (not shown) through which nails 615 pass to engage with the support structure of the building (not shown). Because the flange 614 is positioned behind the adjacent course of siding 610, the nails in flange 614 are hidden from view. In the installation of siding 610, a first course is installed and attached to the building using nails 615. The next course is started by inserting tongue 611 into notch 612 defined by hook 613. That next course is fastened using nail 615 and the process is repeated for further vertical courses. In siding unit 610, the flange 614 is made of solid construction whereas the main body 618 of the unit 610 has a hollow structure. The main body portion 618 has hollow portions 616 which define a web structure. The siding unit has an outwardly facing portion 619a and an inwardly facing portion 619. The web's internal walls 617, 617a provide structure and stability to the unit.

FIG. 7 shows an overlapping installation of the siding unit 720 over adjacent siding units 720. An overlapping joint 722 is formed between adjacent siding units 720. In the installation of the siding unit 720, a first siding unit 720 is applied to a building surface and nailed into place using nails 723 that are directed through apertures 724. The second course of siding unit 720 is then applied overlapping the first course. A stop 721 butts against the upper portion 725 of the next lower unit to provide the appropriate amount of overlap between the adjacent siding units. Unit 720 has a hollow profile structure FIG. 8 shows an alternative installation board and batten scheme. Boards 830 are attached to a building surface using nails 832 directed through apertures 833. Following the installation of a first board, other boards can be installed leaving a gap 836 between courses of boards. The gaps 836 between the boards 830 are covered using battens 831. Battens 831 are attached to the siding system using nails 834 directed through apertures 835 in the battens. In one installation scheme, all the boards 830 are applied to the building surface prior to the installation of any batten 831. In another installation scheme, two courses of boards 830 can be applied to the building surface followed by one course of battens 831. A further board 830 course is applied followed by the appropriate batten 831 installation. The siding units shown in FIG. 8 are substantially rectilinear profiles that are made using the extrusion web technique. With any of these webbed embodiments, the hollow portions may contain "dead air," or the hollow portions may be filled with a suitable foam material.

Figure 9:
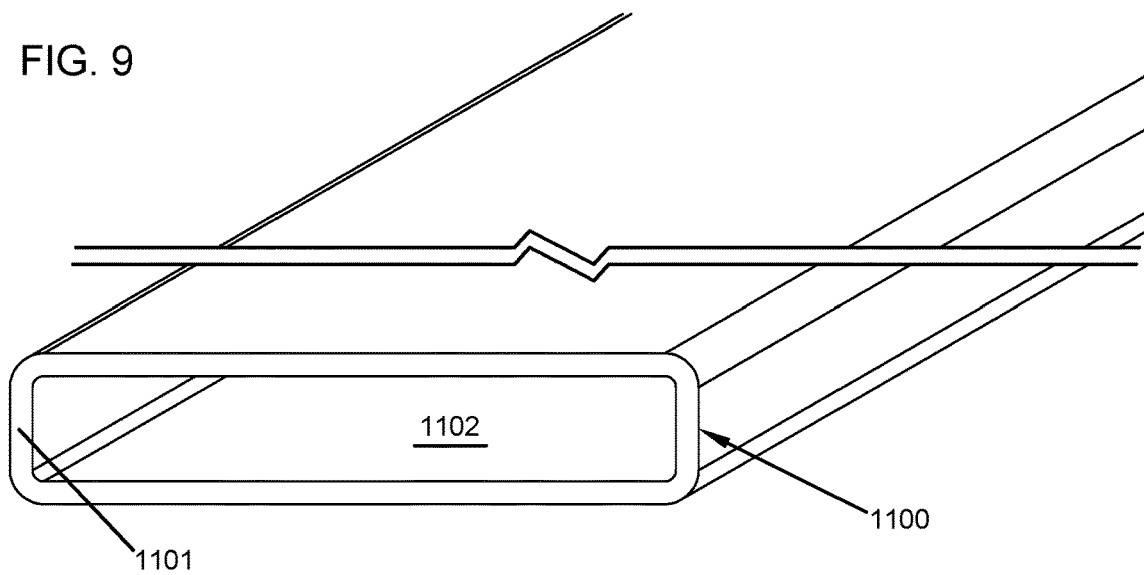
FIGS. 9 and 10 show a hollow profile structural member using the composite material.
Figure 10:
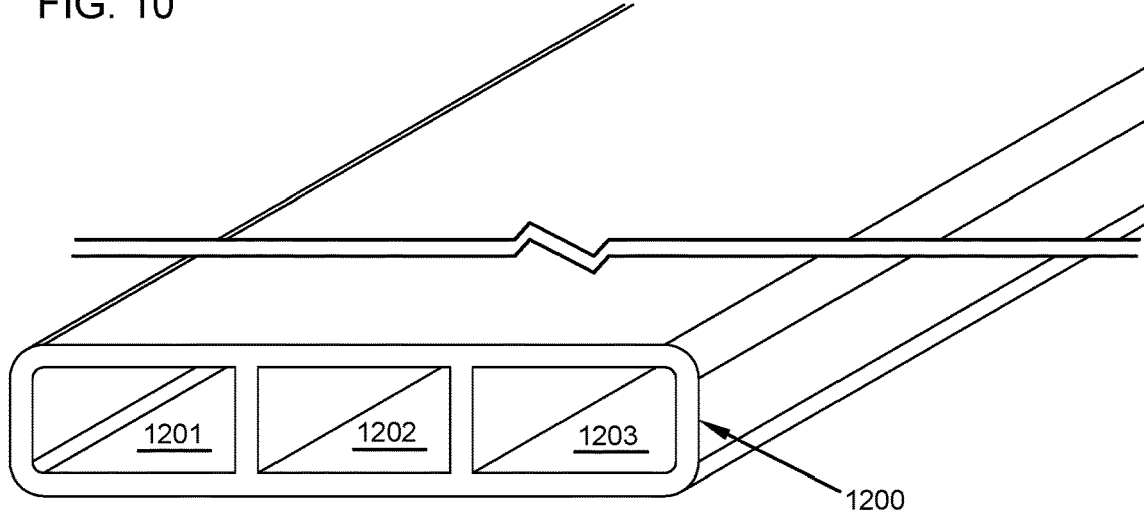
Figure 11:
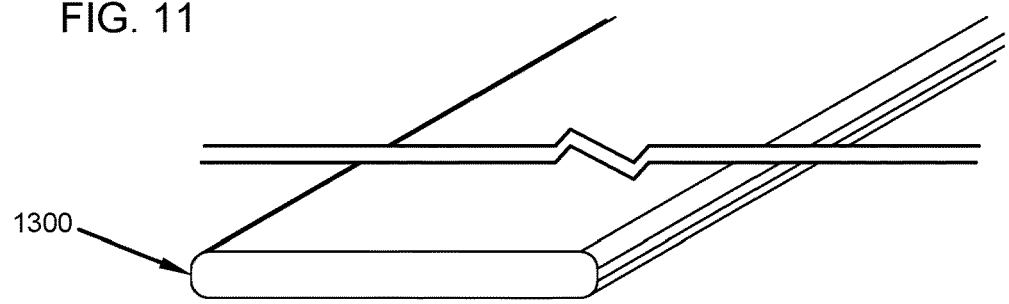
FIG. 11 shows a solid dimensional structural member using the composite material.

FIG. 9-11 shows a structural member 1100 using the composite material 1101. The structural member is shown with a hollow or void interior 1102. Such an interior contributes reduced weight and improved insulating value. The member 1100 can be used as dimensional structural elements. The member can be used in framing, finishing, roofing, flooring, fenestration openings, or other building application. The member can have an arbitrary width, and arbitrary thickness and an arbitrary length. A thickness of at least ½ inch can be used up to for example 4 inches. Widths of 1 to 18 inches for example can be used. Typical construction material lengths are applicable for this number and can range from 1 to 12 feet. Similarly, FIG. 10 shows a structural member 1200 having void spaces 1201, 1202, and 1203. Lastly, FIG. 11 shows a solid structural member 1300 made of the composite.

Figure 12:
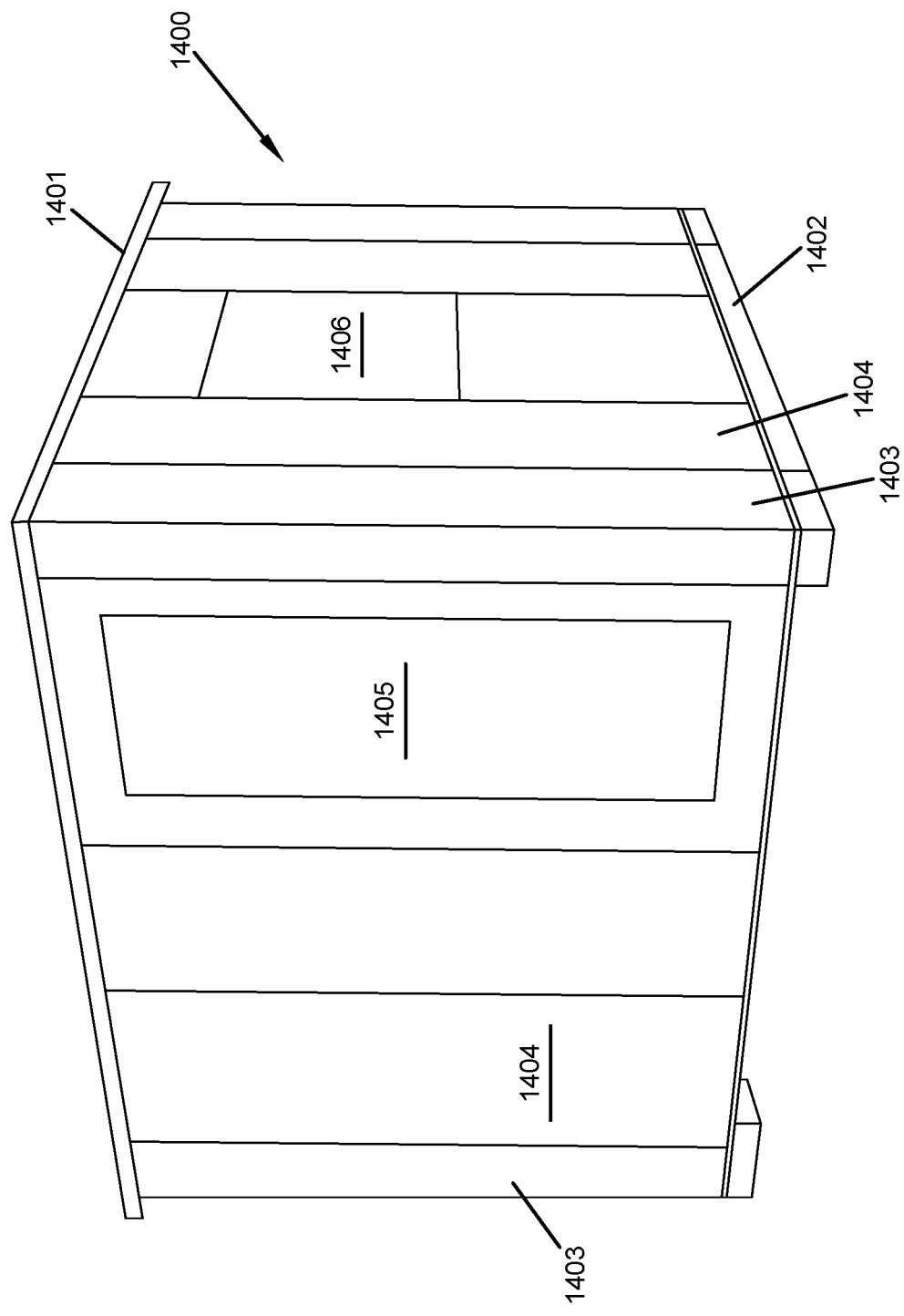
FIG. 12 shows an enclosure formed with structural members using the composite material.
Figure 13:
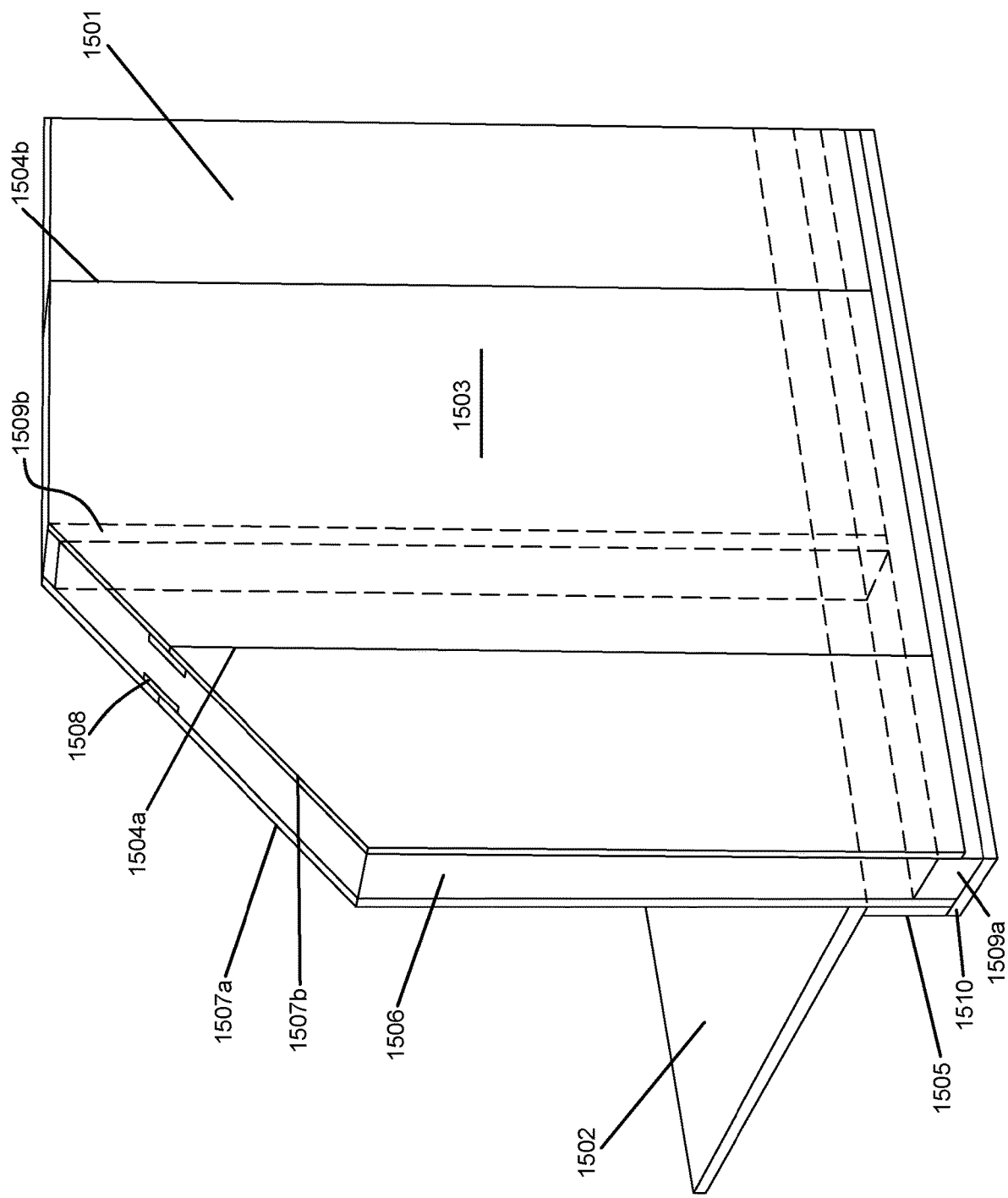
FIG. 13 shows detail from a view of a portion of a wall from the enclosure of FIG. 12.

FIG. 12 shows a hut or enclosure made from structural members and composite panels formed with the composite material. Enclosure 1400 is made with a roof 1401 a base 1402. The roof and base can be made to the panels were members shown in FIGS. 1-13 and can be joined conventionally with fasteners or adhesives [not shown]. Enclosure 1400 is assembled from corner panel 1403 and side panel 1404 that are assembled with conventional fasteners or adhesives. Enclosure 1400 can include such fenestration features such as an aperture for a door 1405 or window 1406. FIG. 13 shows detail from a view of the portion of the wall from the closure of FIG. 12. FIG. 13 shows the assembly 1501 that combines base 1502 with vertical panel 1503, which vertical panel assembled from discrete panels. Vertical panel 1503, in turn, is made from discrete panels that are joined at the joints 1504a and 1504b. Base 1502 is a L-shaped support structure 1505 upon which the panel 1503 is placed. Panel 1503 comprises an interior 1506 of the composite material, with an interior and exterior cap-stock 1507a and 1507b for decoration purposes. The panel can include joint reinforcements 1508, interior panel reinforcements 1509a or 1509b and base reinforcement 1510.

EXAMPLES

Experimental Section

The interfacial modifier used in the following exampleswas titanium triisostearoylisopropoxide (KRTTS), CAS No. 61417-49-0, or a zirconate material, CAS No. 117101-65-2 neopentyl(diallyl) oxy-tri (dioctyl) phosphato-zirconate (NZ-12) (Kenrich Petrochemicals, Bayonne, N.J.). Other interfacial modifiers from KenRich and other suppliers may be used as well to make the wood fiber composite with glass bubbles, glass particles or other particulate.

Methods and Procedures

Wood Fiber and Particle Characterizations

Wood fiber and particle characterization was completed to determine packing behavior of the materials. Packing fraction was determined by dividing the packing density of the fiber and particle by the true density as determined via helium pycnometry. Packing fraction was defined as:

$$P_f = P_d/d_{pync}$$

wherein $P_f$=packing fraction; $P_d$=packing density and $d_{pync}$=pycnometer density.

Packing density was determined by measuring the bulk fiber and/or particle weight within a volume. The packing density was commonly determined by placing the fiber and/or particle within a metallurgical press. The press setup was available from Buehler International (Lake Bluff, Ill.). For frangible materials, pressure was reduced to the appropriate level to reduce breakage of the particles thereby preventing artificially high packing density values. For very frangible materials, a tap density was used. The pycnometer density was determined by helium gas pycnometry (Accu-Pync 1330 manufactured by Micromeritics Corporation—Norcross, Ga.).

Compounding

The polymer and modified wood fiber and particles were fed in appropriate ratios using K-tron K₂O gravimetric weight loss feeders. The wood fiber and particles were fused together within a 19 mm B&P twin screw compounder. Barrel zone temperatures, screw speed, volumetric throughput, and die characteristics (number of openings and opening diameter) were varied depending on the nature of the fiber, particles and polymers being compounded. Commonly, torque, pressure, and melt temperature were monitored responses. A useful way to ensure the proper ratio of polymer and particulate(s) was to place compounded pellets into the heated metallurgical press forming a "puck", the density of which is known as the "puck density".

Extrusion

The compounded products were extruded using 1" diameter extruder (Al-Be Industries, Fullerton, Calif.). Temperatures and volumetric throughput vary depending on the rheological behavior of the materials being extruded. Typically, motor amp load and extrusion pressures were monitored responses and used to gauge ease of extrudability. For samples requiring characterization of tensile properties, the materials were extruded through a 19 mm×3 mm rectangular die plate onto a moving belt to minimize extrudate drawdown.

The following examples and data were developed to further illustrate the embodiments that were explained in detail above. The information illustrates exemplary production conditions and composition for a pellet and a structural member or panel of the embodiment.

To make the composite material with a density of 1.17 g/cc, the components of the composition were combined in the following table. The wood fiber and particles were pre-treated with a coating of the interfacial modifier using the procedures described in U.S. Patent Application 2010/0279100 to produce a homogeneous and uniform, exterior coating on the particulate. As stated before, KRTTS or NZ-12 (Kenrich Petrochemicals, Bayonne, N.J.) was used as the interfacial modifier. The glass particles of beads, Potters 3000A were obtained from Potters Industries (Valley Forge, Pa.). The softwood fiber was obtained from various local millwork manufacturers in Minnesota. The hardwood fiber Maple 4010 was obtained from American Wood Fiber (Schofield, Wis.). The polyvinyl chloride and poly lactic acid polymers used were obtained from PolyOne (Avon Lake, Ohio) and NatureWorks (Minnetonka, Minn.), respectively.

All particulate, wood fiber and glass mixed dispersed particulate were coated uniformly with the interfacial modifier. The coated particulate was mixed with the polyvinyl chloride polymer in a B&P co-rotating 19 mm twin screw compounder with a particle feed rate of 17.38 g/min and a polymer feed rate of 34.08 g/min with a resulting particle to mass ratio of 1.96. The particulate that was uncoated with interfacial modifier, labeled "None" in Table 1, was identical in other components of the composition such as wood fiber loading and identity, glass bead loading and identity, and polymer loading and identity.

Examples 1-4B

TABLE 1

| Examples | Polymer Type | Polymer V (f) | IM Type on Particles | IM Loading Level on Particles (pph) | Particle-1 Type | Particle-1 V (f) | Particle-2 Type | Particle-2 V (f) |
| --- | --- | --- | --- | --- | --- | --- | --- | --- |
| Comparative 1 | PVC | 50% | None | 0.00 | Softwood-80 mesh | 50.0% | None | None |
| 1A | PVC | 50% | Zirconate | 5.00 | Softwood-80 mesh | 50.0% | None | None |
| 1B | PVC | 50% | Titanate | 5.00 | Softwood-80 mesh | 50.0% | None | None |
| Comparative 2 | PVC | 50% | None | 0.00 | Softwood-80 mesh | 42.5% | SGB | 7.5% |
| 2A | PVC | 50% | Zirconate | 4.16 | Softwood-80 mesh | 42.5% | SGB | 7.5% |
| 2B | PVC | 50% | Titanate | 4.16 | Softwood-80 mesh | 42.5% | SGB | 7.5% |
| Comparative 3 | PLA | 45% | None | 0.00 | Softwood-80 mesh | 46.8% | SGB | 8.3% |
| 3A | PLA | 45% | Titanate | 4.16 | Softwood-80 mesh | 46.8% | SGB | 8.3% |
| Comparative 4 | PLA | 55% | None | 0.00 | Softwood-80 mesh | 45.0% | None | None |
| Comparative 4A | PLA | 55% | Titanate | 5.00 | Softwood-80 mesh | 45.0% | None | None |
| Comparative 4B | PLA | 55% | Zirconate | 5.00 | Softwood-80 mesh | 45.0% | None | None |

Polymer Type - PVC-87180 from PolyOne(Avon Lake, OH), PLA - Biopolymer 4043D from Nature Works (Minnetonka, MN).

IM type - an organo-titanate material KRTTS - titanium triisostearoylisopropoxide, anorgano-zirconate material, neopentyl (diallyl) oxy-tri (dioctyl) phosphato-zirconate - NZ12 (Kenrich Petrochemicals, Bayonne, NJ).

Cellulosic Particle (Particle 1) - Softwood-80 mesh, from various local millwork manufacturers;

Hardwood 40 mesh Maple 4010, American Wood Fiber (Schofield, WI).

SGB Solid Glass Bead (Particle 2) - Potters 3000A, Potter Industries (Valley Forge, PA)

TABLE 2

| Examples | Compounding % Torque Low | Compounding % Torque High | Extrusion Pressure (psig) | Extrusion Motor Load (Amps) | Extrusion MFA (sec/10 cc) | Flexural Properties Flexural Modulus (MPa) | Flexural Properties Flexural Strain @ Break | Flexural Properties Stress @ Max Load (MPa) |
|---|---|---|---|---|---|---|---|---|
| Comparative 1 | 25 | 35 | 1360 | 3.7 | 135.3 | 5759.4 | X | 51.688 |
| 1A | 20 | 30 | 530 | 2.8 | 32.3 | 4210.8 | 1.15X | 42.416 |
| 1B | 20 | 30 | 820 | 3.0 | 23.5 | 3452.2 | 1.3X | 34.062 |
| Comparative 2 | 30 | 40 | 1250 | 4.3 | 121.0 | 5491.6 | X | 47.772 |
| 2A | 20 | 30 | 670 | 3.5 | 56.3 | 3892.8 | 1.4X | 37.808 |
| 2B | 20 | 25 | 485 | 3.5 | 44.8 | 3185.6 | 1.4X | 32.442 |
| Comparative 3 | 55 | 65 | 1085 | 3.6 | 22.9 | NR | NR | NR |
| 3A | 45 | 55 | 835 | 3.4 | 5.6 | NR | NR | NR |
| Comparative 4 | 45 | 50 | 350 | 3.2 | 10.3 | NR | NR | NR |
| Comparative 4A | 50 | 60 | NR | NR | 46.8 | NR | NR | NR |
| Comparative 4B | 50 | 60 | 360 | 3.2 | 11.2 | NR | NR | NR |

The composite materials of Table 2 were tested with the following modifications to ASTM D790-10 for flexural properties. The extruded width of all specimens was tested in a range of 18.80 mm to 19.20 mm with a depth of 3.25 to 3.45 mm. Per the standard, the test specimen was thicker than 3.2 mm (which is the situation here), the width was supposed to not exceed ¼th the support span, but it did. The support span=16×thickness=16×3.45=55.2 mm while the specimens averaged 19 mm: 19/55.2=34.4% of the span which was 9.4% wider than the 25% maximum width per the standard. This modification was done since the edge effects of a narrower cut sample would have most certainly skewed the collected information. All samples had a similar cross section and nice edges from being extruded through the die.

The second modification was in the overall displacement of the sample during the test. D790 specifies that the test be terminated after 5% maximum strain of the outer fiber surface. Such a termination would mean that the test be terminated after 0.05*3.45=0.17 mm. The compliance of our materials required us to test beyond the maximum displacement stated in the test since our differentiation did not occur until after much higher displacements and strain levels.

Melt flow analysis (MFA) of the composite material was performed using a Model 50 Mini-Jector from Miniature Plastics Molding (MPM) (Solon, Ohio). The unit was modified with sensor(s) to monitoring a variety of Mini-Jector conditions such as hydraulic fluid pressure, hydraulic piston displacement, ram force, and time.

Melt flow analysis and measurement of the composite material are predictive of the flow characteristics of highly filled and/or reinforced polymeric materials. Melt flow analysis measurements are made under known temperatures and applied pressures/forces causing the tested material to flow past the MPM spreader, through the nozzle tip chambers, and then out the non-drool nozzle of the MPM Mini-Jector to atmospheric pressure in the purging fixture. The mass of material that flows through the Mini-Jector per unit of time is a direct measure of the rheological properties of the tested material under conditions similar to injection molding or process extrusion. Using any of a variety of density measurements of the analyzed materials, the melt flow analysis data can also be converted to time/volume units.

The data in Table 2 shows that interfacial modifying chemistry applied to a fiber and particle reveals 1) favorable rheological properties as seen throughout compounding, extrusion, and 2) the MFA measuring with increasing resolution and differentiation from compounding through extrusion. Some of the enhanced viscoelastic properties and immiscibility between the polymer, particle and fiber are indicated by 1) lower stress at max load, 2) reduced flexural modulus, and 3) increased flexural displacement at break.

In an embodiment, flexural modulus of the composite material, as measured by ASTM D790 will exhibit improved flexural modulus in comparison to composite materials made with particulate that is not coated with an interfacial modifier. By way of example, the flexural modulus for a composite material in accordance with embodiments herein will be 10%, 20%, 30%, 40%, 50%, 60%, 70%, 80%, or 90% less than otherwise identical compositions made with particulate that is not coated with the interfacial modifier. Similar properties for the composite material may be seen in extrusion pressure.

In order to effectively capture the differences, a ratio of flexural displacement for the modified materials vs. that of the unmodified control was generated and calculated for each scenario.

Pellets of composite material were made for Example 5. The composite material had the following properties as listed in Table 3 and the following properties as listed in Table 4.

TABLE 3

| Component | | Vol % | Wt. % |
|---|---|---|---|
| Polymer | PVC 87180 (PolyOne); Density 1.420 g/cc | 60.03 | 66.26 |
| Particulate | | | |
| Wood | 75 wt. % of particulate component | 20.9 | 24.10 |
| Glass Bubbles | 25 wt. % of particulate component | 15.9 | 8.03 |
| Interfacial Modifier | 5 pph of particulate component | 3.2 | 1.61 |

TABLE 4

| Property | Polymer/Wood Fiber/Glass Bubbles Composite | Testing Protocol | Observations |
|---|---|---|---|
| Specific Gravity | 1.17 g/cc | Puck density or Gas pycnometry as described Gas pycnometry as described | |
| Flame Resistance | 0 | UL 94 | Did not sustain flame |
| Water Vapor Uptake | 1.22% | | % Wt. gain per 72 hours |
| Liquid Water Uptake | 1.75% | ASTM D570 | % Wt. gain per 72 hours |
| Impact Strength | 13.0 j/cm | ASTM D5420 | |
| Flexural Modulus | 2900 MPa | ASTM D790 | Supported flat sample |
| Flexural Strength at Yield | 23 Pa | ASTM D790 | |
| Flexural Strength at Break | 45 Pa | ASTM D790 | |
| Tensile Modulus | 700 MPa | ASTM D638 | |
| Tensile Strength at Yield | 15 MPa | ASTM D638 | |
| Tensile Strength at Break | 17 MPa | ASTM D638 | |
| k-value | 0.20 W/m-k | Lee's Disk Apparatus | |

Example 5A—Young's Modulus Test Results

The Young's modulus was measured using a Lloyd's Instrument (AMETEK, Largo Fla.) software automated materials testing system and an ASTM method D-638. Specimens were made according to the test.

The pellet of the composite material displays a Young's modulus of at least 700 Mpa and commonly falls in the range between 600 and 5000 MPa.

The Young's modulus for the polyvinyl chloride compound, was measured similarly to the composite material, was 3000 MPa.

Lengths of the structural member or panel was manufactured and tested for coefficient of thermal expansion, thermal conductivity, decay, corrosion, heat distortion temperature, water absorption, moisture expansion, and compression load. For many of these characteristics, the composite structural member or panel was compared to siding manufactured with conventional siding materials.

The following tables display the test data developed in these experiments and obtained from published sources. The material of the siding unit was indicated by the designation "Fiber/Glass Bubble Polymer Composite" in the Examples below. This "Fiber/Glass Bubble Polymer Composite" composite material was made of 66 wt-% polyvinyl chloride and 24 wt. % interfacially modified coated fiber derived from a hard or soft wood as shown in Table 3.

Using the methods for manufacturing and extruding the pellet, a structural member or panel as illustrated in FIGS. 1-11 is manufactured using an appropriate extruder die. The melt temperature of the input to the machine is 390-420° F. A vacuum is pulled on the melt mass of no less that 3 inches mercury. The overall width of the unit is about 2.0 inches. The wall thickness of any of the elements of the extrudate is about 0.10 inch.

Several-different siding materials were tested and/or analyzed, as shown on the tables below. The data for the five types of siding materials, other than the composite material, was obtained from published sources. For aluminum, the data was obtained from Metals Handbook, Vol. 2, 9th Ed., American Society for Metals, 1990. For PVC, the data was obtained from the specifications and product literature for PVC siding which was manufactured by Reynolds Metals Company of Richmond, Va. For cedar, the data was obtained from Forest Products and Wood Science, J. G. Haygreen and J. L. Bowyer, The Iowa State University Press, 1982. For MASONITE® the data was obtained from the specifications and product literature for MASONITE® siding obtained from MASONITE® Corporation of Chicago, Ill. (The MASONITE® material is a fiber board material made from hard wood fibers and cement binders.) The data for steel was obtained from Metals Handbook, Vol. 1, 9th Ed., American Society for Metals, 1990.

Example 5B—Coefficient of Thermal Expansion Tests

The strain due to a 1° temperature change was known as the coefficient of thermal expansion (COTE). The deformation per unit length in any direction or dimension was called strain.

The coefficient of thermal expansion was measured for the composite siding and for the PVC siding using ASTM Test Method D696. The data for the other materials was obtained from the above published sources.

| Material | COTE (in./in./.degree. F.) |
|---|---|
| Fiber/Glass Bubble Polymer Composite | $3.69 \times 10^{-6}$ |
| Aluminum | $12.1 \times 10^{-6}$ |
| PVC | $36 \times 10^{-6}$ |
| Cedar | $3 \text{ to } 5 \times 10^{-6}$ |
| MASONITE ® | $<3 \times 10^{-6}$ |
| Steel | $12 \times 10^{-6}$ |

The above table shows that the coefficient of thermal expansion for the composite material for the structural member or panel was significantly less than the coefficient of thermal expansion for PVC siding, aluminum, and steel. The composite's coefficient of thermal expansion was similar to that of cedar and MASONITE® siding.

Example 5C—Thermal Conductivity Tests

Thermal conductivity was the ratio of the steady-state heat flow (heat transfer per unit area per unit time) along the rod to the temperature gradient along the rod. Thermal conductivity indicates the ability of a material to transfer heat from one surface to another surface.

The thermal conductivity of the composite siding and the PVC was tested using ASTM Test Method F433. The data for the other materials was obtained from the above published sources.

| Material | Thermal Conductivity (W/mK) |
| --- | --- |
| Fiber/Glass Bubble Polymer Composite | 0.17 |
| Aluminum | 0.173 |
| PVC | 0.11 |
| Cedar | 0.09 |
| MASONITE ® | N/A |
| Steel | 59.5 |

The above table shows that the thermal conductivity of the composite material was slightly more than that of the PVC siding, about the same as aluminum, and significantly less than steel. (The thermal conductivity of MASONITE® was not tested.)

Example 5D—HEAT Distortion Temperature Tests

The heat distortion temperature was the point at which the material begins to warp or become distended. The composite and PVC siding was tested pursuant to ASTM Test Method D648. There was no data given for the metals, because the other materials do not distort until an extremely high temperature was reached. The heat distortion temperature for the composite material was higher than the heat distortion temperature for PVC. (The heat distortion temperature was not measured for those materials having an "N/A" value.)

Example 5E—Moisture Expansion and Water Absorption Test Results

The materials were evaluated with respect to their propensity to expand when subjected to water. The composite and PVC siding were tested for moisture absorption pursuant to ASTM Test Method D570-84. The metal materials were designated "None", because the metals do not absorb water. Cedar was designated "Yes," because it does absorb water and does have a tendency to expand. PVC was designated "N/A," because PVC's water absorption was so low as to not be measurable.

| Material | Moisture Expansion | Water Absorption |
| --- | --- | --- |
| Fiber/Glass Bubble Polymer Composite | NA | 1.1% |
| Aluminum | No | None |
| PVC | No | N/A |
| Cedar | Yes | >100% |
| MASONITE ® | Yes | 12% |
| Steel | No | None |

The above table shows that the composite material has a lower water absorption than cedar and MASONITE®.

Example 5F—Decay and Corrosion Test Results

The materials, Fiber/Glass Bubble Polymer Composite, PVC, Aluminum, Cedar, MASONITE® and steel, were evaluated with respect to their propensity to show decay and corrosion. None of the materials show decay and the Fiber/Glass Bubble Composite was equivalent to aluminum and steel in corrosion performance.

Example 5G—Impact Testing

The determination of the resistance of impact of the main profiles by a falling mass is determined by the following procedure. This procedure is a modification of the Gardner Drop Dart protocol—ASTM 5420.

After testing, the profiles are visually examined for failures which appear at the point of impact. Main profile typically refers to an extruded piece having load bearing functions in a construction such as a window or door. The test surface, sight surface or face surface of the profile is a surface exposed to view when the window is closed. The falling weight, the dart, impacts the face surface, sight surface or exposed surface. A web typically refers to a membrane which can be rigid or non-rigid connecting two walls of the main profile.

One or more test pieces are made by sawing appropriate lengths from typical composite material production profile extrusion pieces. The test pieces are conditioned at a temperature of about 21.1+/−0.2° C. for at least one hour prior to testing. Each test piece is tested within 10 seconds of removal from the conditioning chamber to ensure that the temperature of the piece did not change substantially.

The profile is exposed to the impact from the falling dart mass onto the sight surface, face surface or exposed surface of the profile. Such a surface is the surface designed to be exposed to the weather. The falling mass is dropped directly onto the sight surface at a point midway between the supporting webs. The profile is to be adjusted with respect to the falling mass such that the falling mass strikes in a direction normal to the surface of the test face.

The results of the testing are shown by tabulating the number of test pieces tested, the number of pieces broken or if not broken, the depth of any defect produced in the profile by the test mass.

The composite materials resistance to denting is better than each of the five materials tested, except for MASONITE®. The composite materials dent resistance is significantly better than aluminum and PVC. (No reading could be obtained from the aluminum specimen, because of breakage of the aluminum profile.)

Example 6

The hardwood or softwood particulate from American Wood Fiber and glass particulates from Potters, the dispersed mixed particulate, is first treated with an interfacial modifier such as NZ12. This is done by dissolving the desired amount of the interfacial modifier in a 250 ml beaker containing 50 ml of solvent (usually isopropyl, or some other, alcohol) and then adding 100 grams of mixed particulate into the beaker. The resulting slurry is then heated to an appropriate temperature such as for example a 100° C. and until the mixture can no longer be stirred and most of the solvent has been driven off. The beaker containing the mixed particulate with interfacial modifier is then placed in a forced air oven for drying for a time and temperature, such as, for example 30 minutes at 100° C. The treated mixed particulate is then added to a 100 ml beaker containing a solution of THV220A dissolved in acetone. THV220A is a polymer of tetrafluoroethylene, hexafluoropropylene, and vinylidene fluoride available from 3M (St. Paul, Minn.). The mixture is then heated to a temperature, such as, for example, to 30° C. and continuously stirred until most of the acetone has evaporated. The composite material is then placed in a forced air oven for a time, such as, for example, 30 minutes at 100° C.

After drying, the composite material is prepared and tested for properties as in the previous examples. Extrusion, impact, flame resistance, k-value, water uptake, tensile properties, and flexural properties are properties that are measured to uncoated or non-IM treated particles.

Example 7

The glass fiber from, for example, Pittsburgh Plate Glass (Pittsburgh, Pa.) and glass particulates from Potters, the dispersed glass particulate, is first treated with an interfacial modifier such as NZ12. This is done by dissolving the desired amount of the interfacial modifier in a 250 ml beaker containing 50 ml of solvent (usually isopropyl, or some other, alcohol) and then adding 100 grams of the glass particulate into the beaker. The resulting slurry is then heated to an appropriate temperature such as for example a 100° C. and until the mixture can no longer be stirred and most of the solvent has been driven off. The beaker containing the glass particulate with interfacial modifier is then placed in a forced air oven for drying for a time and temperature, such as, for example, 30 minutes at 100° C. The treated mixed particulate is then added to a 100 ml beaker containing a solution of such as, for example, THV220A dissolved in acetone. THV220A is a polymer of tetrafluoroethylene, hexafluoropropylene, and vinylidene fluoride available from 3M (St. Paul, Minn.). Other polymers such as for example PLA and PVC may also be useful depending on the function and structural of the final article or shape. The mixture is then heated to a temperature, such as, for example, to 30° C. and continuously stirred until most of the acetone has evaporated. The composite material is then placed in a forced air oven for a time such as, for example, 30 minutes at 100° C.

After drying, the composite material is prepared and tested for properties as in the previous examples. Extrusion, impact, flame resistance, k-value, water uptake, tensile properties, and flexural properties are properties that are measured in comparison to uncoated or non-IM treated particles.

While the above specification shows an enabling disclosure of the composite material, other embodiments can be made without departing from the spirit and scope of the invention. Accordingly, the invention is embodied in the claims hereinafter appended.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention claimed is:

1. A thermoplastic composite comprising:
   (i) about 10 to 80 wt. % of a polymer phase comprising a thermoplastic polymer with a density of less than about 1.9 g-m$^{-3}$ and
   (ii) about 20 to 90 wt. % of a dispersed particulate phase comprising greater than 50 wt. % of a reinforcing cellulosic fiber and the balance comprising at least 5 vol. % of a mineral particulate or a glass particulate, the dispersed phase comprising about 0.2-3 wt. % of a coating of at least one interfacial modifier;
   wherein the composite material has a Young's modulus of greater than 700 MPa; the interfacial modifier provides a coating on the dispersed particulate that can form a close association between the particulate and polymer and covalent bonding between fiber, particulate and polymer is not formed.

2. The composite material of claim 1 wherein the cellulosic fiber comprises a wood fiber.

3. The composite material of claim 1 wherein the glass particulate comprises a solid glass sphere.

4. The composite material of claim 1 wherein the glass particulate comprises a hollow glass sphere.

5. A structural member comprising a thermoplastic composite comprising:
   about 10 to 80 wt. % of a polymer phase comprising a thermoplastic polymer with a density of less than 1.9 g-m$^{-3}$ and
   (ii) about 20 to 90 wt. % of a dispersed particulate phase comprising greater than 50 wt. % of a reinforcing cellulosic fiber and the balance comprising at least 5 vol. % of a mineral particulate or a glass particulate, the dispersed phase comprising about 0.2-3 wt. % of a coating of at least one interfacial modifier;
   wherein the composite material has a Young's modulus of greater than 700 MPa; the interfacial modifier provides a coating on the dispersed particulate that can form a close association between the particulate and polymer and covalent bonding between fiber, particulate and polymer is not formed.

6. The composite material of claim 5 forming a structural decking.

7. The composite material of claim 5 forming an extruded panel member.

8. The composite material of claim 5 forming a structural fencing member.

9. The composite material of claim 5 forming at least two extruded panels and joinery features.

10. The composite material of claim 5 comprising a fenestration opening.

11. A filament adapted for use in an additive manufacturing system comprising:
    (i) about 10 to 80 wt. % of a polymer phase, the polymer phase comprising a thermoplastic polymer with a density of less than about g-m$^{-3}$; and
    (ii) about 20 to 90 wt. % of a dispersed mixed particulate phase, the dispersed mixed particulate phase comprising a mixed particulate and about 0.005 to 8 wt. % of a coating of at least one interfacial modifier; the mixed particulate comprising a portion of a reinforcing fiber and a portion of aparticle; wherein the filament has a Young's modulus of greater than 700 MPa.

12. The filament of claim 11 wherein the reinforcing fiber comprises a cellulosic fiber.

13. The filament of claim 12 wherein the reinforcing fiber comprises a wood fiber.

14. The filament of claim 11 wherein the particle comprises a solid glass sphere.

15. The filament of claim 11 wherein the particle comprises a hollow glass sphere.

\* \* \* \* \*